US012597316B2

(12) United States Patent
Byrne et al.

(10) Patent No.: US 12,597,316 B2
(45) Date of Patent: Apr. 7, 2026

(54) GAMING DEVICE, SYSTEM AND METHOD FOR RADIAL-ORBITAL PAYLINE MECHANISM

(71) Applicants: Jason Christopher Byrne, Allambie Heights (AU); Paul Michael Twomey, London (GB)

(72) Inventors: Jason Christopher Byrne, Allambie Heights (AU); Paul Michael Twomey, London (GB)

( * ) Notice: Subject to any disclaimer, the term of this patent is extended or adjusted under 35 U.S.C. 154(b) by 0 days.

(21) Appl. No.: 18/414,447

(22) Filed: Jan. 16, 2024

(65) Prior Publication Data

US 2025/0232643 A1 Jul. 17, 2025

(51) Int. Cl.
*G07F 17/32* (2006.01)

(52) U.S. Cl.
CPC ...... *G07F 17/3244* (2013.01); *G07F 17/3211* (2013.01); *G07F 17/3213* (2013.01); *G07F 17/3262* (2013.01); *G07F 17/3267* (2013.01)

(58) Field of Classification Search
CPC ............. G07F 17/3244; G07F 17/3211; G07F 17/3213; G07F 17/3262; G07F 17/3267
See application file for complete search history.

(56) References Cited

U.S. PATENT DOCUMENTS 5,395,111 A * 3/1995 Inoue .................. G07F 17/3213 463/20
6,105,962 A * 8/2000 Malavazos .......... G07F 17/3202 273/138.2
7,083,168 B2 * 8/2006 Seelig ...................... G07F 17/34 273/138.2
7,216,867 B1 * 5/2007 Luciano .................. G07F 17/32 273/138.2
7,448,948 B2 * 11/2008 Hughs-Baird .......... G07F 17/32 463/19
7,819,741 B1 * 10/2010 Luciano .................. G07F 17/32 463/16
9,908,036 B1 * 3/2018 Pamukchiev ......... A63F 9/0415
12,430,988 B2 * 9/2025 Abrahamson ........... G07F 17/34
2003/0027628 A1 * 2/2003 Luciano .................. G07F 17/32 463/20
2003/0178768 A1 * 9/2003 Luciano .................. G07F 17/34 463/20
(Continued)

FOREIGN PATENT DOCUMENTS

DE 4000719 C2 * 9/1998 ......... G07F 17/3213
EP 1380999 A2 * 1/2004 .......... G07F 17/3211
(Continued)

*Primary Examiner* — David L Lewis
*Assistant Examiner* — Matthew D Hoel
(74) *Attorney, Agent, or Firm* — Michael A Cantor

(57) ABSTRACT

The present invention is a gaming system and method of playing a game that embodies various gaming configurations for enabling inter-related but distinct payline forms and vectoring in a symbol-based game sharing features of a slot-machine type game. Paylines having generally radial and circumferential paths are established through configuration of the gaming geometry. Variations on winning outcome potential for symbol combinations along paylines can be affected depending on the payline form and vector which are established through the geometrical configuration designed for use with the game.

19 Claims, 10 Drawing Sheets

(56) References Cited

U.S. PATENT DOCUMENTS

| | | | | |
|---|---|---|---|---|
| 2004/0018866 | A1* | 1/2004 | Inoue | G07F 17/3213 463/16 |
| 2004/0162133 | A1* | 8/2004 | Jackson | G07F 17/34 463/20 |
| 2005/0119039 | A1* | 6/2005 | Berman | G07F 17/3244 463/16 |
| 2005/0288089 | A1* | 12/2005 | Cammegh | G07F 17/3202 463/17 |
| 2007/0054727 | A1* | 3/2007 | Garamendi | G07F 17/34 463/16 |
| 2008/0214266 | A1* | 9/2008 | Phillips | G07F 17/3213 463/17 |
| 2011/0059789 | A1* | 3/2011 | Luciano | G07F 17/32 463/20 |
| 2011/0218027 | A1* | 9/2011 | Manz | A63F 9/24 463/19 |
| 2013/0029758 | A1* | 1/2013 | Berman | G07F 17/3267 463/25 |
| 2013/0260869 | A1* | 10/2013 | Basallo | G07F 17/3267 463/25 |
| 2016/0093139 | A1* | 3/2016 | Zielinski | G07F 17/3244 463/20 |
| 2016/0125689 | A1* | 5/2016 | Hoffman | G07F 17/3248 463/20 |
| 2016/0189470 | A1* | 6/2016 | Barragan | G07F 17/322 463/20 |
| 2016/0300454 | A1* | 10/2016 | Uss | G07F 17/3288 |
| 2018/0033238 | A1* | 2/2018 | Berman | G07F 17/3267 |
| 2018/0151029 | A1* | 5/2018 | Basallo | G07F 17/3267 |
| 2019/0043314 | A1* | 2/2019 | Abrahamson | G07F 17/3258 |
| 2019/0347896 | A1* | 11/2019 | Beria | G07F 17/3255 |
| 2020/0394874 | A1* | 12/2020 | Abrahamson | G07F 17/3267 |
| 2020/0402350 | A1* | 12/2020 | Beria | G07F 17/3255 |
| 2021/0183208 | A1* | 6/2021 | Helzer | G07F 17/3267 |
| 2021/0312761 | A1* | 10/2021 | Abrahamson | G07F 17/3293 |
| 2021/0375101 | A1* | 12/2021 | Helzer | G07F 17/3267 |
| 2023/0005332 | A1* | 1/2023 | Abrahamson | G07F 17/3288 |
| 2025/0259501 | A1* | 8/2025 | Medford | G07F 17/3209 |

FOREIGN PATENT DOCUMENTS

| | | | | | |
|---|---|---|---|---|---|
| JP | 2008036149 | A | * | 2/2008 | G07F 17/3202 |
| WO | WO-0204080 | A1 | * | 1/2002 | G07F 17/3244 |

* cited by examiner

GAMING DEVICE, SYSTEM AND METHOD FOR RADIAL-ORBITAL PAYLINE MECHANISM

FIELD OF THE INVENTION

The subject matter disclosed herein and the invention claimed relate generally to a gaming system and method for playing wagering games. More specifically, the disclosure relates to payline-based wagering games having geometrically-related features and functionalities that provide for two distinct but inter-related types of paylines, and for providing a different outcome potential dependent on payline.

BACKGROUND

Casino-based gaming whereby players wager money based on a chance to receive a winning outcome is a significant international and domestic commercial market. There are numerous sub-markets within this vast market. They primarily include land-based markets—markets where wagering is conducted on games of chance within licensed physical establishments open to the public; and online markets—markets where wagering is conducted through licensed Internet websites. Additionally, there is social casino gaming which is also conducted online through Internet websites. Though this too is wager-based gaming, it is conducted using virtual currency which has no actual value outside of the applicable Internet website and its use in making wagers on the games that are offered for play within the website's library of available games.

In the United States alone, there are an estimated 57 million persons participating in some form of casino-based gaming. Some 40 percent of people living in the United States have visited a land-based (i.e., not online) casino in the past year. Slot machines are the most popular form of such gaming having generated for themselves over 34 billion dollars in gross gaming revenues in the year 2022 in 44 states, plus the District of Columbia, where such gaming is legal. This does not include online real-money gaming, which has garnered another 5 billion from just six states where such gaming is currently legal.

Slot machines have been a significant form of entertainment for many decades ever since Charles Fey developed the first reel-based, three reel, automatic payout machine in the late 1800s. From that popular game many others have come; each developed using the existing technology of the day and introducing new concepts to add excitement and variation. Thus, from that once simple mechanical game came highly technical electromechanical and electronic video devices that provide a variety of reel games with various forms of bonuses, game features, peripheral devices and intermediary systems to enhance the game and provide greater enjoyment to the player.

What all these devices have in common is at least one area that displays active indicia associated with a game. The indicia are generally referred to as reels and symbols. The reels physically spin if the slot machine is a mechanical-based machine (also known as a stepper machine based on the use of a stepper motor) or are graphically shown to spin (or provide other displays indicative of rotation or changing symbols) if an electronic-based machine having a video screen for display. The electronic-based gaming machine might also display the "spin" in some manner other than a spinning reel, such as a spin of position within the reel, but the result for any of the displays is to randomly present a matrix of symbols. In the prior art, the reels generally form a series of rows and columns in which symbols are randomly selected from a set of symbols, and more specifically from given set associated with each reel, and displayed along the rows and columns. Should the symbols align in a predetermined manner, the game results in a win (value is received by the player in excess of the value wagered) or positive outcome (value is received by the player in the same or lesser amount that that wagered). The simplest form might consist of one row and three columns although generally the simplest of these gaming machines include at least three rows and three columns. The alignment in this instance could only be along that one row and thus there would only be one "payline" such that alignment of symbols in a predetermined manner could only occur along that one row or payline. But as will be discussed, there can be multiple paylines with those games having multiple rows or columns.

To increase the entertainment value of the machines and the amount of money that might be wagered, games were developed with different, larger matrices. The 3×3 matrix was typical (three rows and three columns) as was the later-developed 3×5 matrix. But it was not limited to only these. With these enlarged matrices, as said, various additional paylines could be established. They could run along each of the rows, diagonally from the top row, first column to the last row, first column (or vice versa), or in some other arranged pattern across the columns. If the symbols randomly aligned after the spin in a predetermined outcome along such a payline, the game would provide a winning outcome.

It has always been a goal of the game designer to develop games of ever-increasing entertainment value. The greater the entertainment value the greater the machine's use and, generally, the greater revenue received by the slot machine provider. Therefore, the various forms of matrices and novel methods of devising paylines and such were developed along with colorful graphic displays, animations, bonus games, features, and the like. But always the games included the form of matrix dictated by rows and columns with paylines dictated by such. One such payout scheme developed for enhanced entertainment is known as MEGAWAYS®. That design does not include paylines per se but delivers a win or positive outcome if the symbols of predetermined winning symbol combinations land on adjacent reels. Additionally, in a MEGAWAYS® game there are a random number of symbols, up to seven, assigned to each reel per play. In a six column game, this can amount to 117,649 different winning outcome combinations.

Design and development efforts have been persistent for decades to add these novel aspects and other enhancements to the slot games, as players tend to tire from the same old and seek out inventive new payline games. Though novel and interesting slot machines have been derived for the row and column matrix games, a new manner of slot machine-type game that does not utilize the common form matrix and existing payline arrangements and that determines positive outcomes in a manner different than previously done could prove highly beneficial.

SUMMARY

The present invention is directed to gaming systems and methods of gaming that provide features and functions for a symbol and payline-based wagering game that serves the ever-expanding need to introduce innovative new gaming concepts into the gaming markets. These gaming systems generally require a wager to activate play of a game on a video display screen associated with the system. It is an object of the invention that upon activation, a plurality of symbols are randomly selected from a subset of symbols and arranged about a matrix of positions that enable two distinct types of paylines to be established at varying directions and having variable outcome potential. One form of payline is generally radial. Another form of payline is generally circumferential. The paylines are inter-related such that the number of positions of one form is dependent on the number of positions of the other form of payline. Therefore, for each generally radial payline, a position is established for the generally circumferential payline. Conversely, for each generally circumferential payline, a position is established for the generally radial payline. Symbol combinations established along any of the radial paylines or circumferential paylines through the random selection of symbols that match any predetermined winning symbol combinations provide a return on wager.

In another object of the invention, the number of radial paylines can exceed the number of circumferential paylines thereby creating circumferential paylines of greater length. This relationship creates a higher outcome potential along the circumferential payline than that of the radial payline due to potential for lengthier symbol combinations and multiple symbol combinations. Conversely, the number of circumferential paylines can exceed the number of radial paylines giving rise to potentially higher outcome potential along the radial paylines for similar reasons.

In yet another object of the invention the symbol combinations can be juxtaposed along the payline in any manner giving rise to an increased outcome potential along the circumferential payline due to the non-terminating nature of the circumferential payline.

In yet another object of the invention, the number of radial paylines and circumferential paylines are selectable.

In another object of the invention, one form of payline remains generally radial while another form of payline is generally spiral-shaped. The paylines are inter-related such that the number of positions of one form is dependent on the number of positions of the other form of payline. Therefore, for each generally radial payline, a number of positions are established along the spiral arc. Conversely, for each loop or partial loop of the spiral, a position is established for the generally radial payline. Symbol combinations established along any of the established radial paylines or the established spiral payline through the random selection of symbols that match any predetermined winning symbol combination provide a return on wager.

These and other features, aspects, and advantages of the present invention will become apparent from the following detailed description, drawings, and claims, which describe and illustrate by way of example the principles of the invention.

DETAILED DESCRIPTION

Figure 1:
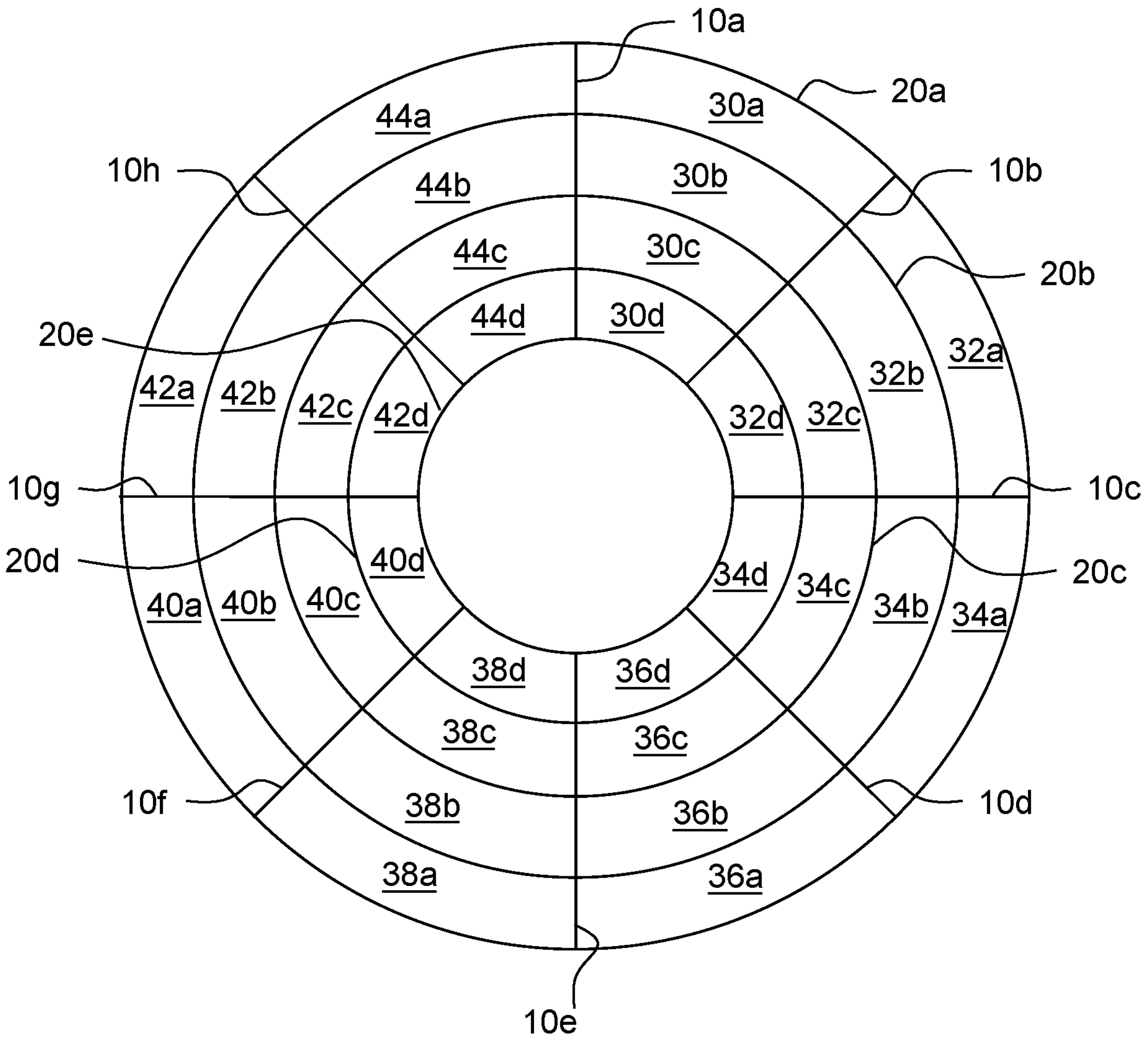
FIG. 1 illustrates the basic features of an example embodiment of an orbital matrix.

In the following description, certain details existing in the prior art may be set forth in order to provide a more thorough description and understanding of the present invention. It will become apparent, however, to one skilled in the art, that the invention may be practiced without some or any of such detail and that it may also be practiced in association with other prior art embodiments not described herein. In other instances, well-known details of the prior art that are otherwise known by those skilled in the art may be left out so as not to obscure the invention and so as not to include superfluous words in the description.

The present invention can be configured for use in a variety of embodiments within a gaming system or gaming device (collectively referred to hereinafter as "gaming system") including an electronic gaming machine (EGM), which encompasses many of the standard components of an electronic, video-based slot machine, or as part of a server-based game delivery system established for online (i.e., Internet) or wide-area network use.

When configured as an EGM, the device is generally used in association with licensed, brick and mortar-type, land-based casino establishments, but is not limited thereto, and may be used in other gaming establishments such as route locations (i.e., venues licensed for gaming as a secondary commercial enterprise that have a substantially limited number of EGMs), racinos, cruise ships that provide wager-based gaming, or gaming licensed riverboat operations. When configured for use with a server-based game delivery system, the gaming system can be configured for use with online real-money gaming through licensed Internet-based casinos or with social casino gaming through social gaming websites. But the configurations are not so limited. For instance, a type of server-based game delivery system different and distinct from those that provide online real-money gaming or social casino gaming may be established within a land-based casino that provides for the delivery of games to EGMs residing therein. Additionally, Internet websites may exist that provide free-to-play games outside the confines of social casino gaming websites. Further, downloadable software may enable local play of the game on a player's personal computing device. For the present invention there need only be the software necessary to enable use of the gaming features and functions that are the subject of this disclosure regardless of the gaming system in which it is configured.

The basic, necessary software of the gaming system that enables use of the gaming features and functionalities disclosed herein is software and the instructions that reside therein that enable the receiving of a wager as a prerequisite to playing a game of chance, displaying the game of chance and its operation on a video display screen, and providing a return based on a winning or positive outcome (a positive outcome being a return of less than or the same as the amount wagered, and a winning outcome being a return of more than the amount wagered; to be referred to hereinafter collectively as a “winning outcome”). Further discussion of these configurations and the necessary software modules and devices for providing the necessary inputs and outputs associated therewith will be discussed further within this disclosure.

Notwithstanding the configuration utilizing the gaming features and functionalities that are the subject of this disclosure, once a wager is made and play of the game is initiated, the game and game dynamics are displayed on a video display screen of the gaming system. The wager will be made in real or virtual currency, both generally being reduced to denominational credit units, per the gaming system software. The number of credit units will depend on the amount of value received and the denomination selected or set within the gaming system, as will also be further described. Example embodiments of the gaming features and functionalities of the present invention will now be disclosed.

FIG. 1 displays the indicia used in conjunction with a gaming system for an example embodiment. Radial lines 10*a*, 10*b*, 10*c*, 10*d*, 10*e*, 10*f*, 10*g*, and 10*h* are shown intersecting with a series of concentric circles 20*a*, 20*b*, 20*c*, 20*d* and 20*e* to form a number of positions 30*a*-44*d*. In this embodiment, there are eight radial lines 10*a* through 10*g* and five radial concentric circles 20*a* through 20*e* to form the thirty-two different positions 30*a* through 44*d*. Within various subsets of positions 30*a* through 44*d* there are orbits and sections.

Figure 2A:
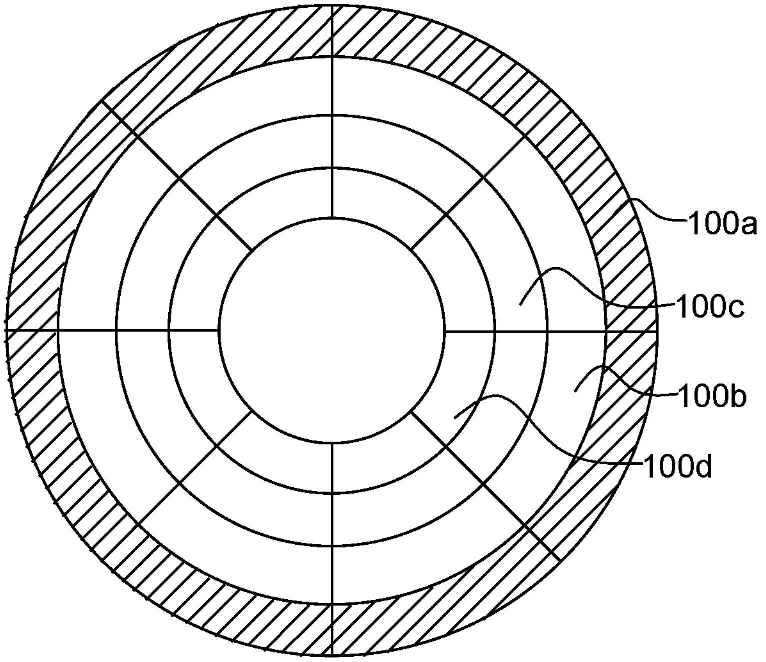
FIG. 2A illustrates a component of the orbital matrix.

Turning to FIG. 2, orbits 100*a* through 100*d* are formed from a subset of positions 30*a* through 44*d* that are located between each of two adjacent concentric circles. Sectors are formed from a subset of positions 30*a* through 44*d* located between each of two adjacent radial lines. Orbit 100*a* is prominently displayed in FIG. 2A. This orbit is comprised of the ‘a’ positions. Additional orbits 100*b*, 100*c* and 100*d* are also displayed. They are respectively comprised of the ‘b’, ‘c’ and ‘d’ subsets of positions 30*a* through 44*d*. Four orbits are thus formed from the embodiment of FIG. 1 having five concentric circles 20*a* through 20*e*, each possessing the following positions:

| | | | | | | | | |
|---|---|---|---|---|---|---|---|---|
| Orbit 100a | 30a | 32a | 34a | 36a | 38a | 40a | 42a | 44a |
| Orbit 100b | 30b | 32b | 34b | 36b | 38b | 40b | 42b | 44b |
| Orbit 100c | 30c | 32c | 34c | 36c | 38c | 40c | 42c | 44c |
| Orbit 100d | 30d | 32d | 34d | 36d | 38d | 40d | 42d | 44d |

Figure 2B:
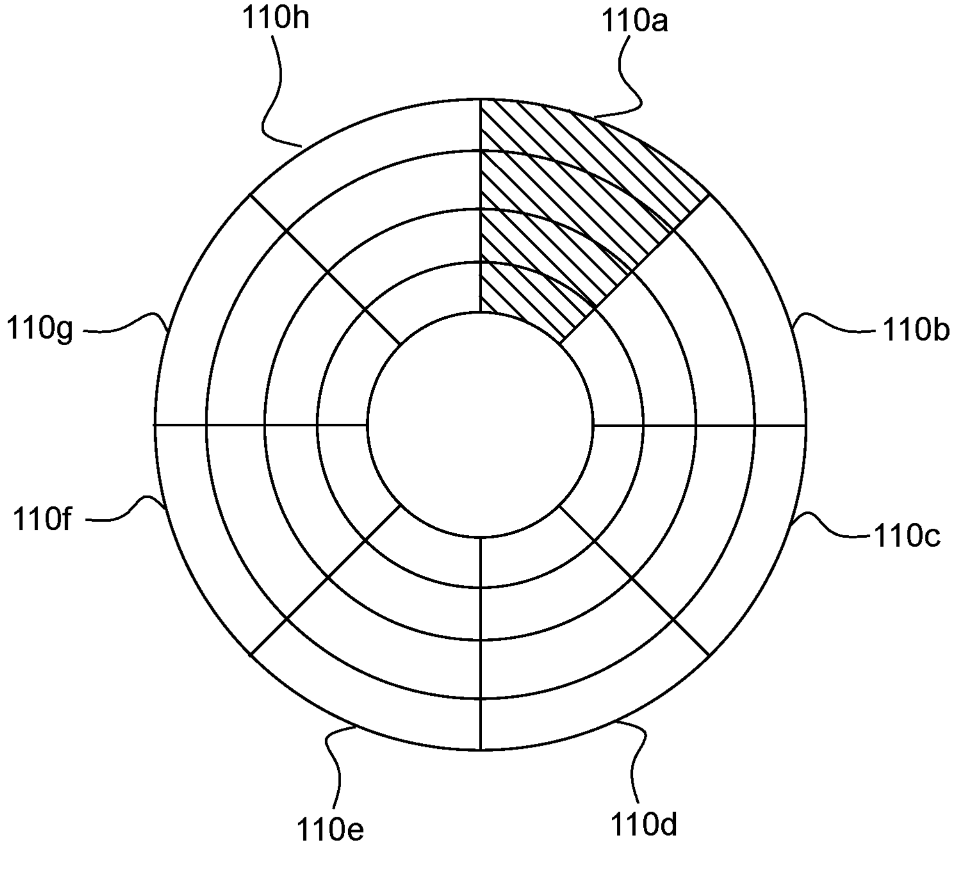
FIG. 2B illustrates a component of the orbital matrix.

In FIG. 2B, sector 110*a* is prominently displayed. This sector is comprised of the ‘30’ positions. Additional sectors 110*b*, 110*c*, 110*d*, 110*e*, 110*f*, 110*g*, and 110*h* are also displayed. They are respectively comprised of the ‘32’, ‘34’, ‘36’, ‘38’, ‘40’, ‘42’ and ‘44’ positions. Eight sectors are thus formed from the embodiment shown in FIG. 1 having the eight radial lines 10*a* through 10*h*, each possessing the following positions:

| | | | | |
|---|---|---|---|---|
| Sector 110a | 30a | 30b | 30c | 30d |
| Sector 110b | 32a | 32b | 32c | 32d |
| Sector 110c | 34a | 34b | 34c | 34d |
| Sector 110d | 36a | 36b | 36c | 36d |
| Sector 110e | 38a | 38b | 38c | 38d |
| Sector 110f | 40a | 40b | 40c | 40d |
| Sector 110g | 42a | 42b | 42c | 42d |
| Sector 110h | 44a | 44b | 44c | 44d |

This geometric layout, referred to as an “orbital matrix”, produces 32 (4 by 8) positions, four orbits and eight sectors. In other example embodiments, orbital matrices of various numbers of sectors, orbits or shapes may be utilized. For example, the layout could consist of a 3 orbit by 6 sector orbital matrix; or 6 orbit by 12 sector orbital matrix; or 5 orbit by 5 sector orbital matrix; essentially any combination of orbits and sectors limited only by the desire to form a payline along at least one sector and along at least one orbit. Theoretically, this requires at least two positions formed along at least one sector to form what will be later described as a sector payline and at least two positions must exist along at least one orbit to form what will be later described as an orbital payline. (Geometrically, there will always have to be at least two sectors to accommodate at least two positions of the orbit). Additionally, the geometry of the layouts shown in FIGS. 1 and 2 consisting of radial lines of symmetry and concentric circles are not required. Any geometrical layout, including but not limited to those shown in FIG. 3 will suffice. The only requirement to practice the invention is an orbital matrix of sufficient geometry to provide enough positions to form at least two adjacent positions within a sector and within an orbit to enable the formation of two paylines of having different characteristics. Though all described as orbital matrices, some are of forms and shapes that are other than circular.

Figure 3A:
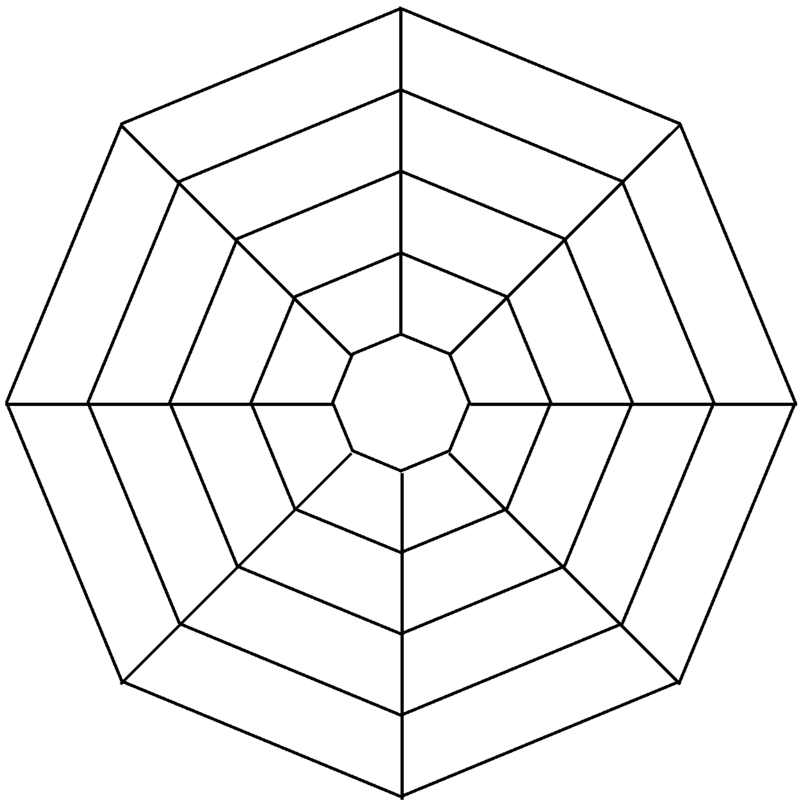
FIGS. 3A, 3B, 3C and 3D illustrate various geometrical embodiments similar to the orbital matrix.

Referring to FIG. 3, the example embodiment of FIG. 3A is similar to that of the example embodiments shown in FIGS. 1 and 2. The distinction is that instead of concentric circles to form orbits, straight and equidistant lines from polar center and relative to each other are used as the connection points between the radial lines to form the positions. This embodiment is merely an aesthetic modification as the same orbits, albeit in different, noncircular form, and the same sectors, albeit again in different form, are similarly established. Similarly, FIG. 3B displays an example of another aesthetic embodiment that is elliptical in shape. The orbits comprise ellipses that are symmetrical about center but vary proportionally to each other along the minor and major axes. The radial lines are also composed of symmetry about the major and minor axes. Again, this is merely an aesthetic modification embodiment as the same orbits, albeit again in different form, and the same sectors, albeit again in different form, are similarly established. FIG. 3C displays yet another example embodiment. This layout is rectangular in shape. Similar to the other example embodiments of FIGS. 3A and 3B, the same orbits, albeit in different form once again, and the same sectors, albeit again in different form, are similarly established. As will be later discussed, these similarities lend themselves to the establishment of orbital paylines and sector paylines that, although of different appearance, will similarly function.

It is noted that although example embodiments of FIGS. 1, 2, and 3 are shown in a preferred symmetrical geometry, such is not a necessity. The geometry need not be symmetric. One preferred embodiment used with the present invention but having some features different from the orbital matrix of FIGS. 1 and 2, or the example embodiments of FIGS. 3A, 3B and 3C, is that shown in FIG. 3D. FIG. 3D shows spiral-shaped geometry or a spiral matrix. The spiral matrix will be later discussed in greater detail.

Figure 4:
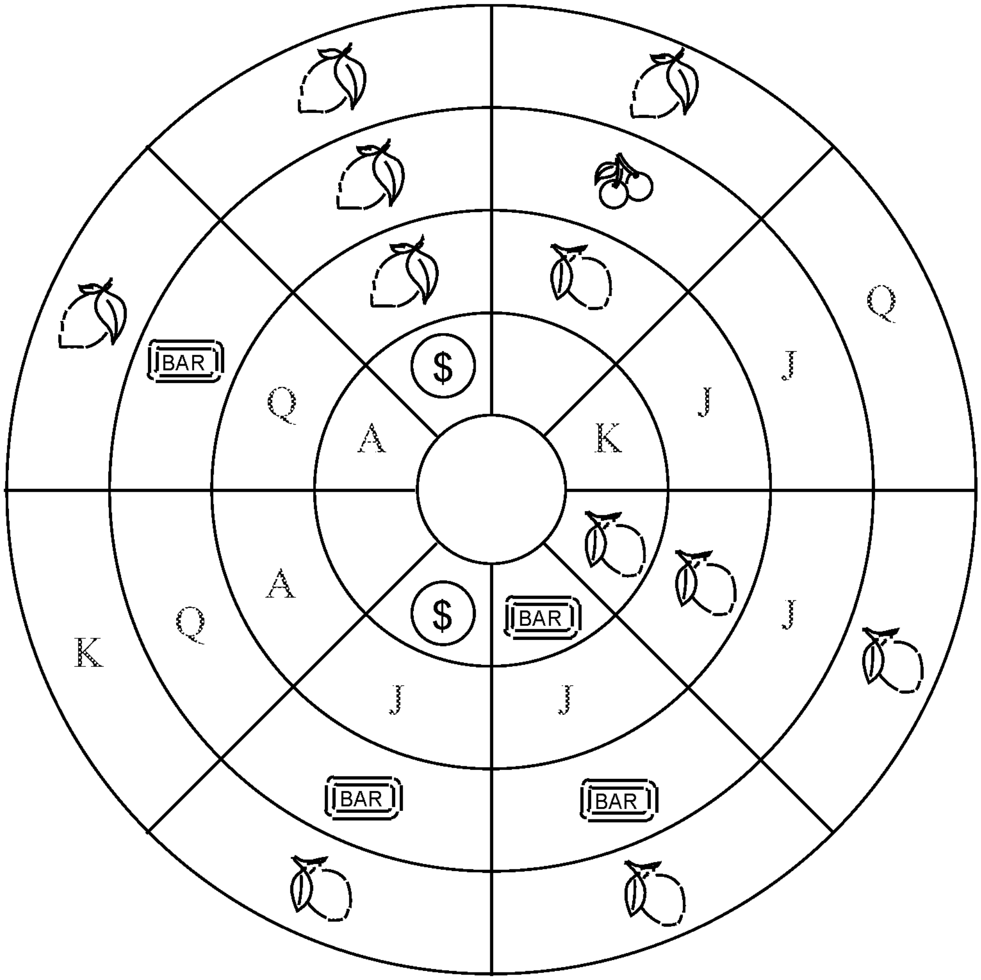
FIG. 4 illustrates a random game outcome using in the orbital matrix.

FIG. 4 illustrates an outcome from the play of a game on the gaming system featuring the embodiment of the orbital matrix of FIGS. 1 and 2. Symbols 200*a* through 270*d* displayed within positions 30*a* through 44*d* are randomly selected upon wager and activation of the game from a subset of symbols through software instructions of the gaming system. Each position possesses a distinct area with one symbol displayed therein. Notwithstanding the positioning of the symbols within positions 30*a* through 44*d*, the symbols need not be displayed within the positions. Symbols can be displayed on the radial lines 10*a* through 10*h* and on concentric circles 20*a* through 20*e*. In this alternate embodiment, the number of symbols will be increased. Therefore, instead of four symbols displayed within each of the four positions of sectors 110*a* through 100*h*, five symbols will be displayed on each of the five concentric circles 20*a* through 20*e*. Therefore, four positions versus five concentric circles. The discussion will be primarily directed to symbols within the formed positions. However, the alternative embodiment of symbols located along the features that form the positions; i.e., the radial lines and concentric circles in this embodiment, regardless of whether such features are made visible to the player, is applicable to the discussion.

Symbols 200*a* through 270*d* are randomly selected though the random number generator of the gaming system. Random number generators are well known in the slot machine gaming arts. It is an integral software module of the gaming system used for determining game outcome. For each game outcome on a gaming system the random number generator determines which symbols, through random selection from the set of symbols, are to be displayed in each of the various positions of the orbital matrix. Upon game activation, a symbol is randomly selected by the random number generator for each of the positions of the orbital matrix and displayed therein. As previously indicated, the symbols need not be displayed within positions but can also be displayed on the radial lines and on the orbital lines. Since the symbols selected in the prior game may still be displayed, more accurately, the previously displayed symbols are replaced with newly selected symbols. Game activation occurs after a wager is made and upon signal delivered to and detected by a computer processor to process the software encoded instructions, including operation of the random number generator to determine symbol selection and game outcome.

Each symbol of the symbol set is typically weighted relative to the other symbols of the set so that some of the symbols are selected and displayed at greater or lesser frequencies than others. This is also well-known in the slot machine gaming art. Paytables are established to provide different payouts based on the predetermined symbol combinations. The less frequent the symbol combination results, the greater the payout. Symbol combinations can be of any predetermined combination. A three-symbol combination of a certain symbol may provide a greater return on wager due to the lesser chance of occurrence than a three-symbol combination of another symbol. Additionally, lengthier symbol combinations will provide a greater return than those of shorter length due to a lesser chance of occurrence. Therefore, a five-symbol combination of a symbol more likely to occur could provide a return on wager that is greater than that of a three-symbol combination of a symbol that is less likely to occur. The game math is established, accordingly, and a paytable establishes a series of predetermined symbol combinations and the return each would receive on the wager.

In conventional slot machine gaming art, symbol combinations generally must initiate on the first virtual reel or row and extend along at least a three-reel payline to form a three symbol combination. If initiated on the second reel, even if what would otherwise be a predetermined symbol combination that would provide a return, no return is provided. Initiation on the first reel is a requirement for a return to be provided.

Some games may also include special symbols which, should they appear at any position within the matrix in a predetermined number of positions, notwithstanding the position in which the special symbols appear, a payout is provided based on the number of positions in which they appear. Additionally, some games in the slot machine gaming art do not utilize payline wins but a concept generally referred to as "ways" whereby the symbol combination will be met if the necessary symbols to meet the combination exist in any position of any of the adjacent reels, subject in most games to initiation of the symbol combination on the first reel.

For there to be a winning outcome, a predetermined winning symbol combination must occur along a payline. The payline is determined as a specified path of positions along which the symbols are displayed. The paths of positions are coded into the game, except in "ways" games where predetermined symbol combinations need not follow a prescribed path. There can be any number of paylines designed into the game. In standard slot machine games, paylines can take a straight line path across the reels, a diagonal path, a zig-zag path, or any other path across the reels as designed by the game software. They run along a path defined by one position of one reel to one position of the next reel for the entirety of all the reels associated with the game.

In any given play of a payline game, any number of payline wins can occur if there is more than one active payline and a predetermined winning symbol combination across more than the one payline. In most payline games, the paylines must be selected in order to receive the possibility of achieving a winning outcome along the payline. This selection of the number of paylines controls the total wager amount and increases the number of possibilities for achieving a winning outcome since the more paylines selected the greater the chance of receiving a predetermined symbol combination. However, selection of paylines is not the only aspect that controls wager amount. In most games, a wager amount per payline can be selected. The product of that amount multiplied by the number of paylines is the total wager.

With that prior art background, we now turn back to the orbital matrix. In preferred embodiments, the symbols are displayed one to a position within positions 30*a* through 44*d*. There are six different symbols—a cherry, cloves, a bar, acorns, bells and a dollar sign—randomly displayed within each of the 32 positions. All but the cherry symbol are displayed multiple times. Depending on how they are arranged will determine the game outcome. This is similar to that of the typical slot machine that displays symbols within the positions formed by the rows and columns of the slot machine matrix. Although unlike those slot machines that prescribe paylines across the columns of matrix, in the present invention there exists both sector paylines and orbital paylines follow a path of positions across the orbits and across the sectors of the orbital matrix.

Figure 5A:
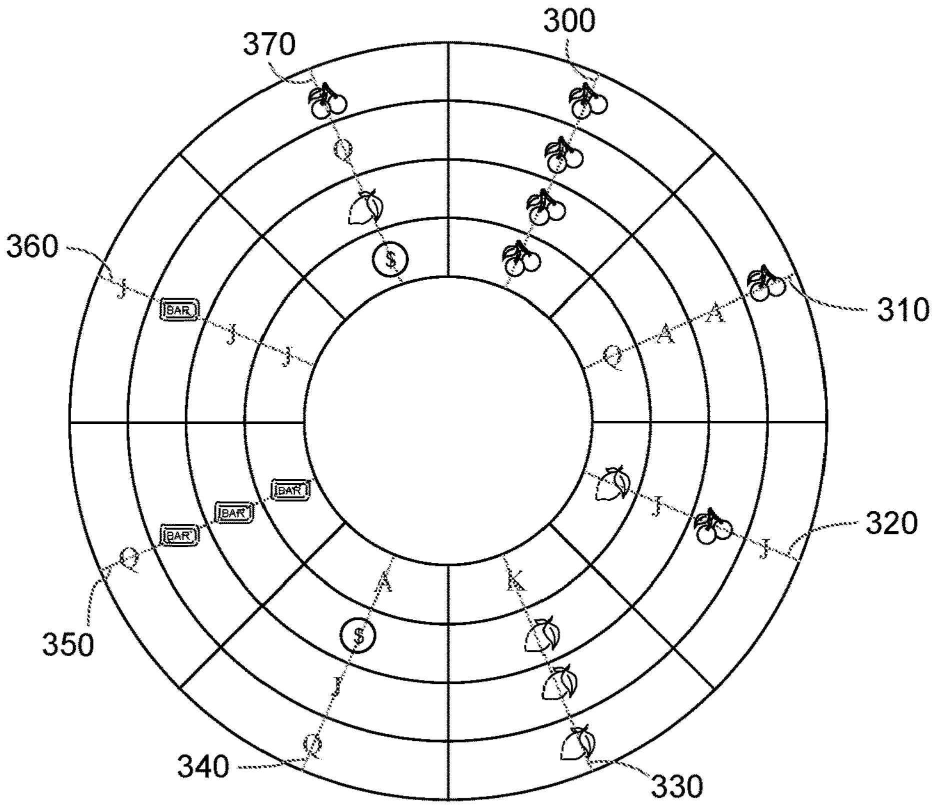
FIG. 5A illustrates sector payline wins along sectors of the orbital matrix for a random game outcome.
Figure 5B:
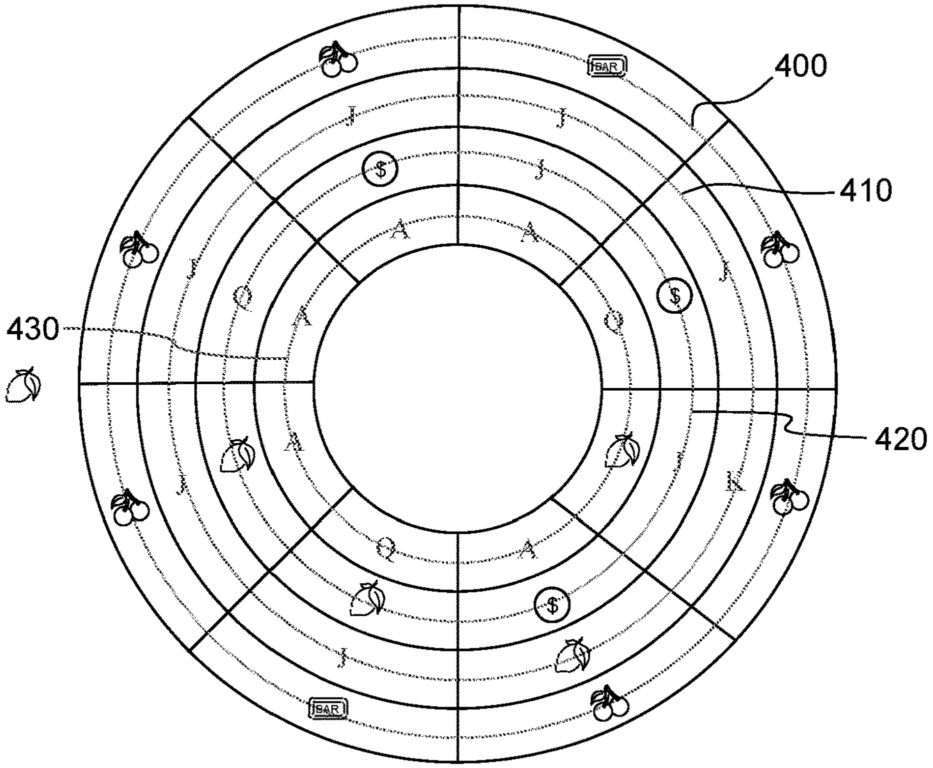
FIG. 5B illustrates orbital payline wins along orbits of the orbital matrix for a random game outcome.

Referring to FIGS. 5A and 5B, sector paylines and orbital paylines are shown, respectively, in an orbital matrix of the same configuration as FIGS. 1 and 2; i.e., having four orbits and eight sectors Sector paylines extend across each of the positions of the sector in a sequential manner from either the innermost or outermost position to the other position. If a symbol combination that is a predetermined winning symbol combination is displayed along the sector, it is a winning outcome regardless of its juxtaposition within the sector. There is no requirement in the preferred embodiment that a symbol be displayed in a given position of the sector to enable a winning outcome for the predetermined winning symbol combination. In other embodiments, a predetermined winning symbol combination may be required to have one symbol of the combination of symbols displayed within the innermost or outermost position to be effective as a win. But in the preferred embodiment, this is not required. Additionally, in the preferred embodiment, each sector payline only encompasses positions within the same sector and no other. Therefore, there are no diagonal paylines, zig-zag paylines, or paylines of any path other than that through the positions of the sector. Additionally, each orbital payline encompasses only positions of the same orbit and no other and similarly follows no other path of positions other than those positions within the given orbit.

FIG. 5A provides examples of predetermined winning symbol combinations. Payline 300 in sector 110*a* displays a cherry symbol along each of positions 200*a*, 200*b*, 200*c*, and 200*d* of the sector. In an exemplative paytable (not shown), this symbol combination provides a winning outcome. Payline 330 in sector 110*d* displays an acorn symbol in the position of the outermost orbit 230*a* and same symbol in the next two adjacent positions 230*b* and 230*c*. In the same hypothetical paytable, this symbol combination—three sequential acorn symbols—also provides a winning outcome. In this embodiment the symbol combinations can initiate or lie along any of the positions of the sector. Since sectors 110*a* through 110*h* each have only four positions and a three-symbol combination is the minimum length winning symbol combination, this means that a winning symbol combination must initiate from either the innermost or outermost position. But if the predetermined winning symbol combination were of shorter length (e.g., two adjacent symbols) or if sectors 110*a* through 110*h* included one or more additional positions, a three-adjacent winning symbol combination could lie or be juxtaposed anywhere along the payline and within the sector. In other embodiments, the predetermined symbol combinations must include one of the symbols of the predetermined winning symbol combination in either the innermost or the outermost position.

In the symbol combination of sector 110*f* sector payline 350 displays the bar symbol in the innermost position 250*d* of the innermost orbit 100*d* and same bar symbol in the next two adjacent positions 250*c* and 250*b*. This, too, is a winning symbol combination—three sequential bar symbols—in the same hypothetical paytable given the lack of requirement to include one of the symbols of the predetermined winning symbol combination in a specified position. Since the symbol combination in sector 110*a* encompasses all positions along sector payline 300, if there had been a requirement to include one of the symbols of the predetermined winning symbol combination within a specified position, the requirement would be moot given the inclusion of the flower symbol in all of the positions of the sector.

In addition to certain embodiments including the embodiment that requires the symbol combinations to have one of the symbols in a given position to be effective, other embodiments of the invention can include alternative or additional paylines that follow different patterns and therefore follow a path of positions that are in different sectors. For instance, a diagonal payline that, from the innermost position, moves clockwise to the next position in the next orbit and then clockwise to the next position in the next orbit and so forth until reaching the position of the outermost orbit. Any form of sector payline could be established through coding of the gaming system software.

FIG. 5B shows four orbital paylines 400, 410, 420 and 430 for each of the four orbits. Each payline encompasses each position of the respective orbit. Therefore, each payline is an eight position payline in this embodiment as opposed to the four position sector paylines. Winning symbol combination (in accordance with an exemplative paytable not shown) comprised of three adjacent symbols—three cherry symbols—in each of positions 32*a*, 34*a*, and 36*a* is shown along the outermost orbital payline 400 in orbit 100*a* as is predetermined winning symbol combination in each of positions 40*a*, 42*a* and 44*a*—along the same payline 400 and orbit 100*a* Thus, two predetermined winning symbol combinations will provide a return to the player for this one orbital payline. Another winning symbol combination comprised of four adjacent symbols—the Aces or 'A' symbol—is shown along orbital payline 430 in positions 40*d*, 42*d*, 44*d* and 30*d* of the innermost orbit 100*d*. One other winning symbol combination is shown comprised of six adjacent symbols—the Jack or 'J' symbol—on the second outermost orbit 100*b* of payline 410 along positions 38*b*, 40*b*, 42*b*, 44*b*, 30*b*, 32*b*. This six symbol combination is not possible along a sector since sectors in this embodiment comprise only four positions. It is thus apparent that in the present embodiment orbital paylines are of more value than sector paylines given the ability to achieve lengthier winning symbol combinations which, having lesser probability of occurrence, provide a greater return on the wager. Whereas the sector payline in this embodiment can only provide a maximum four symbol combination payout, an orbital payline can provide a maximum eight symbol combination payout. Statistically, given that the random number generator is designed to randomly select symbols from a subset of symbols, an eight symbol combination will be a much less likely outcome than a four symbol combination (and including seven, six or five symbol combinations). Additionally, given the number of positions of the orbits in this embodiment, more than one predetermined winning symbol combination can be achieved. For instance, a three-symbol combination and a four-symbol combination, a two four-symbol combination, or a two three-symbol combination (assuming the paytable requires at least a three symbol combination to achieve a winning outcome) are all possible. This adds further value potential.

The variance in potential value between sector paylines and orbital paylines will differ depending on the layout of the orbital matrix. In other layouts; for instance, an 8 orbit by 4 sector layout, the sector paylines will extend through eight positions and thus have more value than the orbital paylines which will extend through only four positions. The variance in potential value between sector paylines and orbital paylines adds a certain excitement and variation to the game.

It is a feature of the invention that there be both sector paylines and orbital paylines (or similarly, as will be discussed, spiral paylines). It is also a feature of preferred embodiments that the number of positions along a sector differs from the number of positions along an orbit (or vice versa). This generates two types of paylines which encompass a different number of positions resulting in a dissimilar potential of outcome.

Though in preferred embodiments there is a variance in potential outcome between the sector and orbital paylines due to varying length or otherwise, in other embodiments the sector paylines and orbital paylines may be equivalent in the number of positions they encompass (for instance a 4 orbit by 4 sector matrix) thereby making the variance in potential value between the two types of paylines null (all other aspects being equal). That said, in the preferred embodiment and in nearly all embodiments, the orbital paylines will never be self-terminating. Therefore, there is no first position or last position. A winning symbol combination can appear and be juxtaposed along any of the positions of the payline. This is distinguishable from sector paylines where the innermost position can only be adjacent the outermost position when there are only two positions of the sector. If there are any more than two positions, the innermost position can never be adjacent to the outermost position along a payline due to the self-terminating nature of the payline at the innermost and outermost positions. These inherent aspects of the orbital paylines and sector paylines for the preferred embodiments will always provide a potential outcome advantage to the orbital paylines. The only embodiment whereby all aspects are equal is when there are an equal number of orbits and sectors and the orbits are assigned a first position and a last position such that symbol combination must initiate or terminate, respectively, at each.

Notwithstanding the number of available positions along the payline, paytable constraints may relegate winning symbol combinations to a maximum number of positions that is less than the number of positions encompassed by the payline. In the embodiment of FIG. 5A therefore, if a maximum five symbols are specified as a predetermined winning symbol combination of like symbols, should six, seven or eight appear sequentially along the payline, only the maximum five-symbol combination shall be provided a return on wager. Therefore, though a six-symbol combination is displayed along payline 410, the gaming software would assess the outcome as the five symbol combination along positions 38*b* through 30*b* or 32*b* through 40*b* pending on the reading sequence as provided by the software instructions; but reading only five of the six sequential symbols for the predetermined winning symbol combination. The sixth symbol would not be considered part of that combination. Alternatively, the paytable may provide the same payout or return for a five-symbol or greater symbol combination. Therefore, all of the five-symbol, six-symbol, seven-symbol or eight-symbol combinations would receive the same return on wager. If an eight-symbol combination of like symbols were displayed along any of the orbital paylines (not shown), although the eight-symbol combination would not provide a return as an eight-symbol combination (but might as a five-symbol combination in the alternative embodiment described, just above), the gaming software would provide for a return both on a combination five-symbol combination and three-symbol combination (assuming at least three symbols required to achieve a winning symbol combination outcome). Alternatively, the gaming software would provide a return on two four-symbol predetermined winning symbol combination outcomes. The gaming software would dictate the selected outcomes in that situation but likely would provide whichever gave the greater return; i.e., the combined five and three symbol combinations or the combined two, four symbol combinations.

Figure 3B:
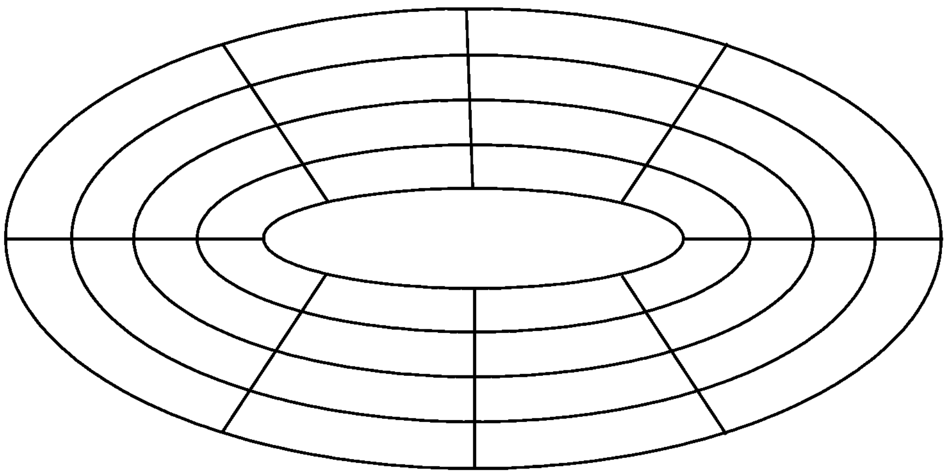
Figure 3C:
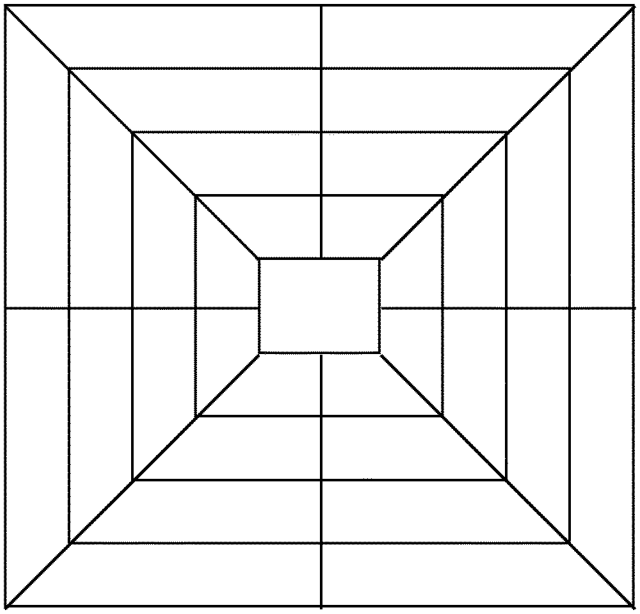
Figure 3D:
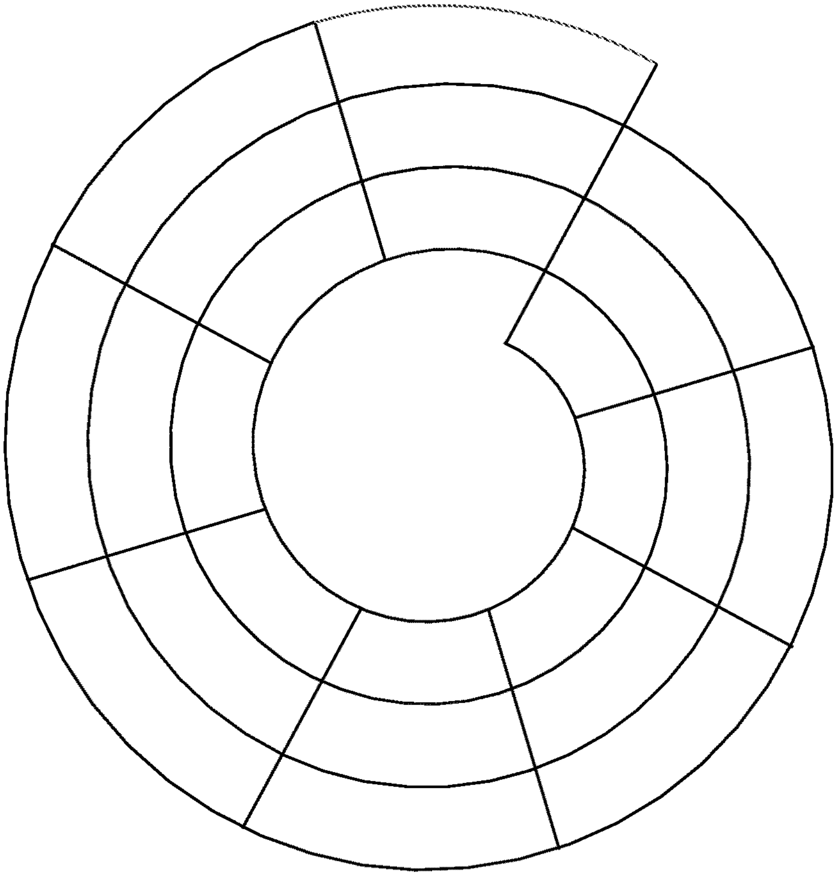
Figure 6:
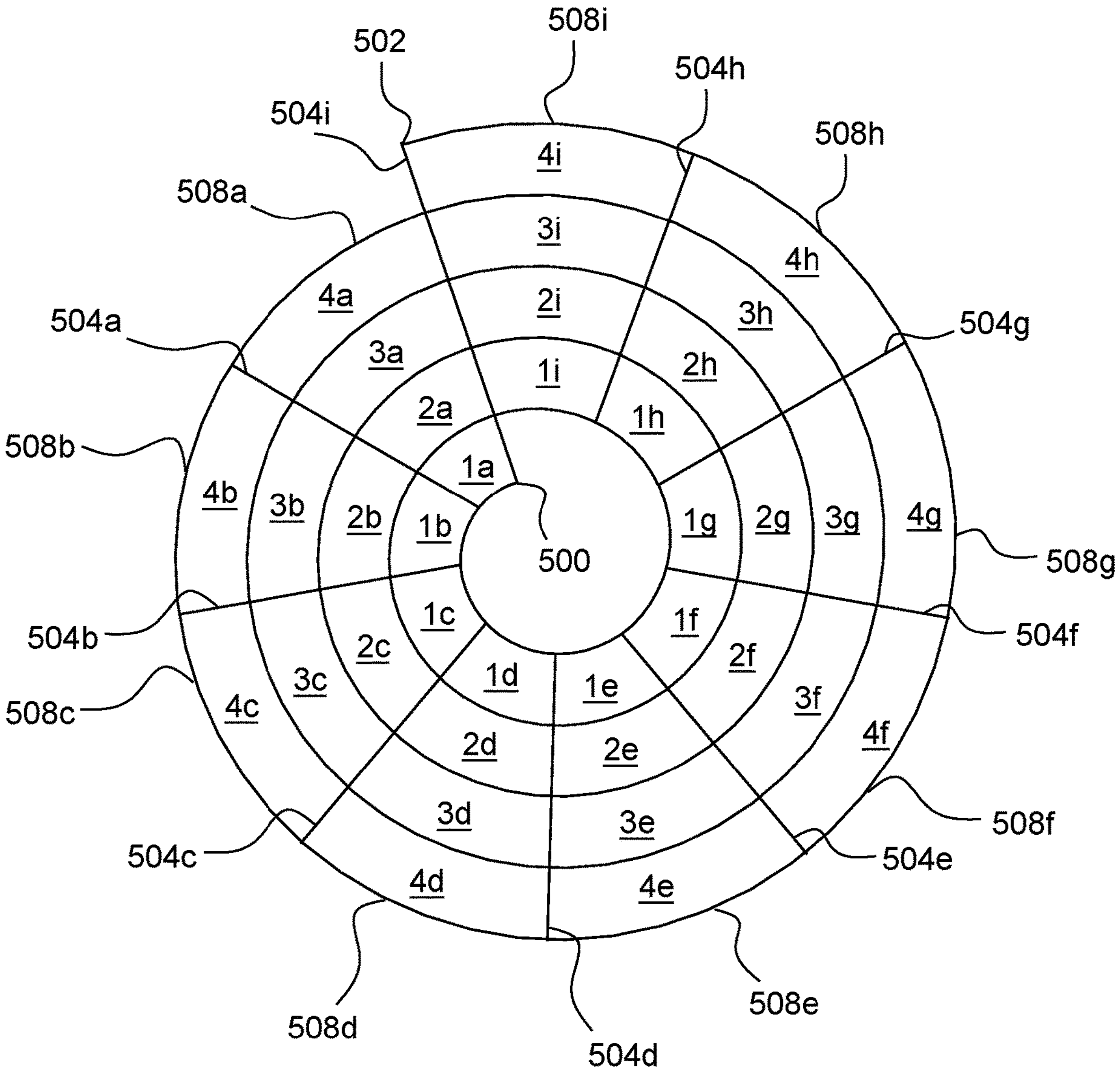
FIG. 6 illustrates the basic features of an example embodiment of a spiral matrix.

Turning now to the spiral matrix illustrated in FIG. 3D and discussed briefly as an embodiment of the invention having features and functionalities differing in some respects from the orbital matrix and the other geometrical embodiments of the orbital matrix displayed in FIG. 3A through 3C. FIG. 6 illustrates an example embodiment of a spiral matrix. The spiral matrix is an unenclosed feature having end points 500 and 502 forming a spiral arc. It spirals or loops from end point 500 in multiple loops until reaching end point 502. As in other embodiments, the nine radial lines 504*a* through 504*i* extend across each loop of the spiral. The spiral matrix is composed of five complete loops about end point 500 and terminates at endpoint 502. The geometrical layout of this five-loop, nine radial line example embodiment creates a total of 36 positions. Radial line 504*i* extends radially from end point 500 in a generally orthogonal direction relative to the loops until reaching the outermost portion of the spiral where it terminates. Since the spiral loops are complete rotations, this termination point is point 502, where the end of the spiral arc at it outmost loop meets with radial line 504*i*. Radial line 504*a*, which is adjacent radial line 504*i*, extends radially from a point on the innermost loop of the spiral in a generally orthogonal direction relative to the loops of the spiral until it intersects with the outermost loop of the spiral. Radial lines 504*b* through 504*h* similarly extend from their respect points on the innermost loop of the spiral to the outermost loop; each adjacent to the next and relatively equidistant and equally angled relative to one another with 504*h* equidistant and equally angled relative to adjacent radial line 504*i*. Though the example embodiment of a spiral matrix displayed in FIG. 6 shows nine radial lines across five loops of the spiral to form 36 positions, as with the orbital matrix, any number of loops and any number radial lines can be established to create a spiral matrix of any number of positions. A variation of the spiral matrix from that of the orbital matrix of FIG. 1 and FIG. 2 is that, given the properties of a spiral which radiates out from the polar center in an equidistant amount per degree of rotation, the radial lines remain angularly symmetric but not linearly symmetric from polar center since with each incremental angle the spiral distances itself further from polar center.

Nine sectors 508*a* through 508*i* are formed from the embodiment shown in FIG. 6 having nine radial lines 504*a* through 504*i*. The sectors are comprised of the following positions:

| | | | | |
|---|---|---|---|---|
| Sector 508a | 1a | 2a | 3a | 4a |
| Sector 508b | 1b | 2b | 3b | 4b |
| Sector 508c | 1c | 2c | 3c | 4c |
| Sector 508d | 1d | 2d | 3d | 4d |
| Sector 508e | 1e | 2e | 3e | 4e |
| Sector 508f | 1f | 2f | 3f | 4f |
| Sector 508g | 1g | 2g | 3g | 4g |
| Sector 508h | 1h | 2h | 3h | 4h |
| Sector 508i | 1i | 2i | 3i | 4i |

In the preferred embodiment of the spiral matrix, the positions along the arc length of the spiral comprise a payline—a spiral payline. Since there are 36 positions in the example embodiment displayed in FIG. 6 and the spiral payline encompasses all 36 positions thereby establishing one, 36 position long payline. Positions 1*a* through 4*i* in sequential order along the spiral length constitute the spiral payline. Thus, the order of the spiral payline starts at position 1*a*, and continues to position 1*b*, 1*c*, 1*d* . . . 2*c*, 2*d*, 2*e* . . . 3*d*, 3*e*, 3*f* . . . 4*e*, 4*f*, 4*g*, 4*h* and ends at position 4*i*. Alternatively, depending on the programming of the game software, the spiral payline may be read first at position 4*i* and read last at position 1*a*, or in some other manner. The only relevance is that winning symbol combinations as specified by the paytable of predetermined winning symbol combinations lie along the spiral payline regardless of the manner in which the payline is read.

In an alternative embodiment of the spiral matrix, segments are established along the open-ended spiral. Each segment is thus a portion of a multi-sectored spiral whereby an equivalent number of positions lie along each of the segments. Given the 36 positions along the example embodiment of FIG. 6, the spiral can be intersected at four locations to produce four segments each encompassing an equal number of nine positions per segment. Therefore, in this alternative embodiment configuration, the spiral matrix will have four spiral paylines, as opposed to one in the preferred embodiment, that follow the paths of the positions encompassed within each of the four segments as follows:

| | | | | | | | | | |
|---|---|---|---|---|---|---|---|---|---|
| Segment 1 | 1a | 1b | 1c | 1d | 1e | 1f | 1g | 1h | 1i |
| Segment 2 | 2a | 2b | 2c | 2d | 2e | 2f | 2g | 2h | 2i |
| Segment 3 | 3a | 3b | 3c | 3d | 3e | 3f | 3g | 3h | 3i |
| Segment 4 | 4a | 4b | 4c | 4d | 4e | 4f | 4g | 4h | 4i |

Other embodiments of the spiral matrix are possible. For one, the spiral arc could be segmented in a manner to produce lesser or greater numbers of spiral paylines, or paylines of varying position lengths. Additionally, similar to that of the embodiment of the orbital matrix whereby the symbols lie along the radial lines and orbits and therefore not within the positions formed by such, an alternative embodiment for the spiral matrix can position the symbols to lie along the radial lines and spiral arc. In the same manner as that of the orbital matrix, an additional symbol will be added to the sector payline for such embodiment.

Figure 7A:
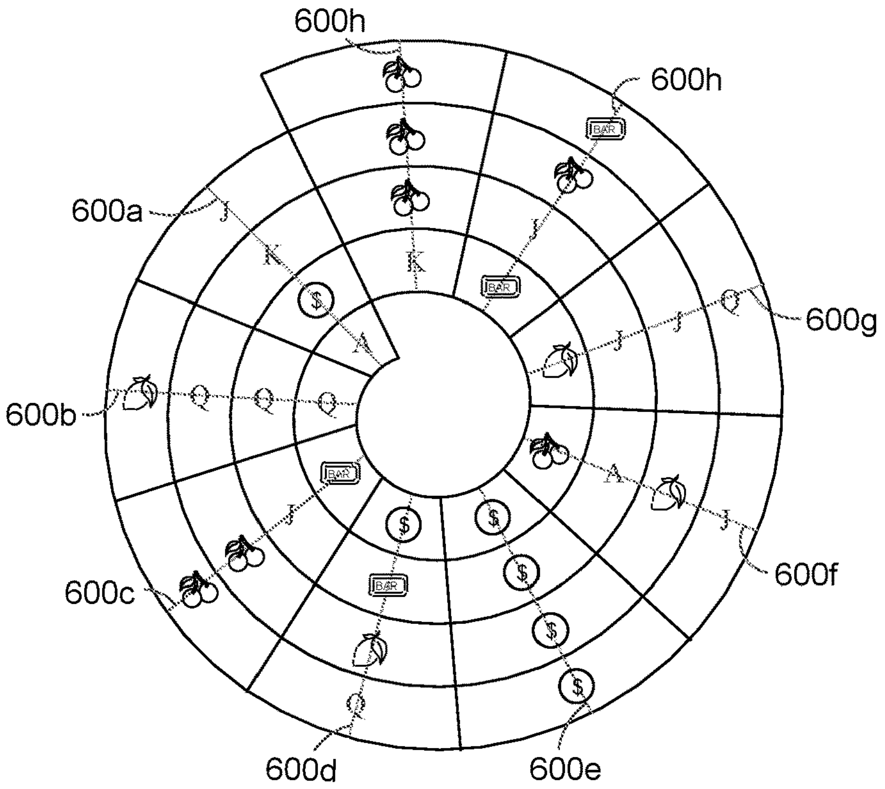
FIG. 7A illustrates sector payline wins along sectors of the spiral matrix for a random game outcome.
Figure 7B:
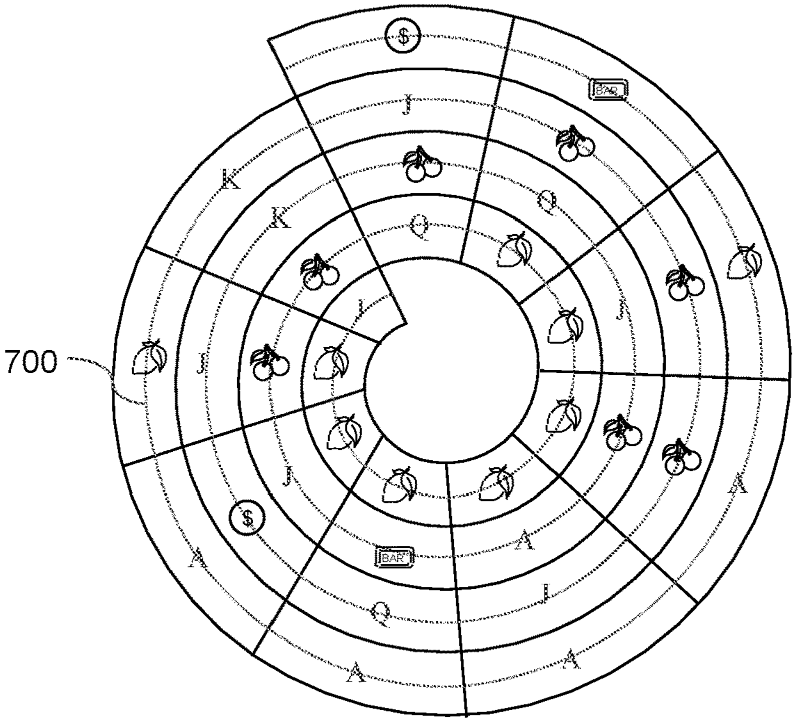
FIG. 7B illustrates spiral payline wins along the spiral of the spiral matrix for a random game outcome.

FIG. 7A and FIG. 7B display game outcomes using the spiral matrix layout of the example embodiment of FIG. 6. In FIG. 7A, the sector paylines 600*a* through 600*i* which encompass the respective positions shown in the table above for sectors 508*a* through 508*i* are aligned in a manner similar to that of the orbital matrix; from either the innermost or outermost position of the sector to the innermost or outermost position of the same sector, as applicable, for each of the sectors. The difference is that the corresponding positions of each sector are not equidistant from polar center or end point 500 as they are with the orbital matrix but increase in distance away from polar center as the section of the spiral increases in radial distance from polar center along the spiral arc. But geometrical variation has no bearing on the operational aspects of the payline. The spiral payline comprises all positions along the entire arc length of the spiral. Therefore, in this embodiment, given the number of spiral loops and the number of radial lines, there are nine sector paylines and one spiral payline.

FIG. 7A shows examples of predetermined winning symbol combinations along each of sector paylines 600*b*, 600*e* and 600*h*. Sector payline 600*b* in sector 508*b* displays the Queen or 'Q' symbol in the innermost position 1*b* of the spiral for sector 508*b* and the same symbol in the next two adjacent positions 2*b* and 3*b* of sector 508*b*. Payline 600*e* in sector 508*e* displays the dollar sign symbol all positions 1*e*, 2*e*, 3*e* and 4*e* of the spiral for sector 508*e*. Payline 600*h* in sector 508*h* displays the cherry symbol in the outermost position 4*i* of the spiral for sector 508*i* and the same symbol in the next two adjacent positions 3*i* and 2*i* of sector 508*i*. Given that a hypothetical paytable defines these symbol combinations as predetermined winning symbol combinations, a return is provided upon occurrence for each of the three described symbol combinations.

Spiral payline 700 encompasses all positions along the spiral length of the spiral. Spiral payline 700 in the example embodiment of FIG. 7B enables the potential to achieve lengthy pre-determined winning symbol combinations. FIG. 7B shows a total of 36 positions along the spiral arc length. Theoretically the gaming software could be coded to award a payout for a 36-symbol predetermined winning symbol combination. This would receive the highest return on wager being the least probable outcome of similar like-symbol combinations. However, the gaming software may limit the maximum symbol combination to a certain number of symbols. If the gaming software limited the embodiment of FIG. 7B to a maximum of five symbols, seven winning symbol combinations would be theoretically achievable (5 symbols×7 occurrences=35<36 total positions). If limited to a maximum of nine symbols, for instance, a maximum of four winning symbol combinations are possible (9 symbols×4 occurrences=36=36 total positions). Additionally, if a three-symbol combination were a winning outcome, it could theoretically occur 12 times across the spiral payline (3 symbols×12 occurrences=36=36 total positions). The symbol combinations need not be of like symbols. Any manner of predetermined winning symbol combinations could appear along the spiral payline limited only by the maximum number of symbols for the given predetermined winning symbol combination and the number of positions along the arc length of the spiral.

FIG. 7B shows three different winning symbol combinations along the spiral payline. One is a seven-symbol combination of acorn symbols encompassing positions 1*b*, 1*c*, 1*d*, 1*e*, 1*f*, 1*g*, and 1*h*. Another is the combination of three sequential cherry symbols displayed in positions 3*f*, 3*g* and 3*h*. Another is the combination of four Ace symbols or 'A' displayed in positions 4*c*, 4*d*, 4*e*, and 4*f*. All are along the spiral payline. All are predetermined winning symbol combinations for a given hypothetical paytable for the game defined by this embodiment and thus all receive a return based on the wager made. Though the preferred embodiment of the spiral matrix includes sector paylines and one spiral payline, an alternative embodiment segmented lengths along the spiral payline establishing a distinct number of paylines along a subset of positions of the arc length and therefore a lesser number of positions across which the payline extends. This design might tend to the maximum numbered winning symbol combination. Thus, if a six-symbol combination were the maximum numbered winning symbol combination, the segments may be designed to be only six positions of arc length.

A novel feature of the spiral matrix is a form of cascading. Cascading is a concept in the prior art for conventional slot machines having column by row matrices. Winning combinations are made to graphically disappear. The remaining symbols then fall into place or cascade in an effect that appears gravitational. The empty positions are filled from the symbols that were displayed just above. Once that emptied position is filled with the symbol from above, the position from where that symbol was previously displayed is also filled in with the position from above. However, if the symbol that replaced a prior symbol of a winning combination was on the top row, a new symbol is randomly selected to fill its previous position. The newly symbol combination are then reassessed to determine if any new predetermined winning symbol combinations exist and to provide a return if there are. The process repeats until there are no further predetermined winning symbol combinations.

In the spiral matrix, winning symbol combinations are made to disappear. The symbols are shifted outward or inward along the spiral arc, depending on the game software programming, to fill in the positions void of symbol. New symbols are randomly selected and displayed at the end of the spiral to compensate for the resulting empty positions. All of the sector paylines and the spiral payline are reassessed to determine if there are any new symbol combinations that match any predetermined winning symbol combinations. If there are, a return is provided based on the wager made and the process repeats until there are no further winning symbol combinations. Since both the sector paylines and spiral payline are re-assessed, the potential for new winning symbol combinations is not insignificant.

The spiral slot provides a novel approach to the type of cascading described since the two-form paylines (i.e., sector paylines and spiral payline) are bidirectionally assessed. It is this bidirectional assessment that creates a significant reestablishment of symbol combinations along the paylines. This aspect provides a similar advantage to the orbital matrix since it also maintains two-form paylines (i.e., sector paylines and orbital paylines) that are bidirectionally assessed for winning symbol combinations. One form of bonus inherent to the orbital matrix and spiral matrix is the disappearing symbols or symbol combinations. Game outcomes that include winning symbol combinations include the steps of removing those symbols and replacing the positions where they were displayed with randomly selected new symbols. The paylines are then re-read to see if there are any new winning symbol combinations and any of such are provided a return. The process is repeated until no further winning symbol combinations are read. In alternative embodiments of this bonus, symbols other than winning symbol combinations may disappear and be replaced with new randomly selected symbols. Additionally, the replaced symbols can be given an "effect" such that as they are made to disappear, they cause surrounding symbols to also disappear and then similarly be replaced. This provides a more accentuated effect to the bonus.

Another novel feature that can be implemented with the orbital matrix and spiral matrix is a form of sorting. This provides extended play and the potential to achieve additional outcomes including winning outcomes. In the orbital matrix, upon receiving an outcome based on the randomly selected symbols, assessing the sector paylines and orbital paylines for predetermined winning outcomes and providing a return on wager should any appear, a new symbol array is displayed. In one arrangement, like symbols appearing along the sector paylines are grouped together regardless of where they were displayed along the sector payline in the original outcome. This arrangement or sorting is completed for each sector. After completion, if predetermined symbol combinations appear, a return is provided in accordance with the paytable. The table below shows the result of a random original game outcome of a 4 by 8 orbital matrix having symbols represented by A, B, C, D, E, F, and H:

| | Sector 1 | Sector 2 | Sector 3 | Sector 4 | Sector 5 | Sector 6 | Sector 7 | Sector 8 |
|---|---|---|---|---|---|---|---|---|
| Orbit 1 | E | E | D | B | B | B | H | E |
| Orbit 2 | E | A | D | C | H | H | C | H |
| Orbit 3 | E | B | D | B | C | C | C | C |
| Orbit 4 | F | C | D | B | H | F | C | D |

The table below presents a re-arrangement of random outcome of symbols based on a sorting of each sector:

| | Sector 1 | Sector 2 | Sector 3 | Sector 4 | Sector 5 | Sector 6 | Sector 7 | Sector 8 |
|---|---|---|---|---|---|---|---|---|
| Orbit 1 | E | A | D | B | B | B | C | C |
| Orbit 2 | E | B | D | B | C | C | C | D |
| Orbit 3 | E | C | D | B | H | F | C | E |
| Orbit 4 | F | E | D | C | H | H | H | H |

As can be seen, there are now groupings of symbols along not only the sectors but also the orbits that did not previously exist. For instance, the previously existing symbol combinations E-E-E along Sector 1; D-D-D-D along Sector 3; and C-C-C along Sector 7 remain. However, the new symbol combination B-B-B along Sector 4 now appears as do symbol combinations C-C-C along Orbit 2 and H-H-H-H along Orbit 4. Some of the previously appearing symbol combinations along the orbits were eliminated as a result of the sort. The new symbol combinations are assessed to determine if any match predetermined winning symbol combination and for any that do, a return on wager is provided.

Similarly, a re-arrangement of the random outcome of symbols can be performed based on a sorting of each orbit. Such re-arrangement is shown in the table below:

| | Sector 1 | Sector 2 | Sector 3 | Sector 4 | Sector 5 | Sector 6 | Sector 7 | Sector 8 |
|---|---|---|---|---|---|---|---|---|
| Orbit 1 | B | B | B | D | E | E | E | H |
| Orbit 2 | A | C | C | D | E | H | H | H |
| Orbit 3 | B | B | C | C | C | C | D | E |
| Orbit 4 | B | C | C | D | D | F | F | H |

In this sorting of the orbits, new symbol combinations B-B-B along Orbit 1, H-H-H along Orbit 2, and C-C-C-C along Orbit 3 are formed. Note that the symbol combination E-E-E along Orbit 1 previously existed in the original game outcome for the preferred embodiment that includes non-terminating orbital paylines. Thus, the E-E-E symbol combination would not be considered a new symbol combination resulting from the sort in the preferred embodiment.

Yet another form of sorting can occur. This can be a second sort after the aforementioned re-arrangement of the sectors or the orbits, or it can be the first sorting albeit in two sorting steps. In this embodiment of the bonus, the sectors can first be re-arranged as indicated above and then re-arranged about the orbits. Thus, two re-arrangement steps with an interim sort, which can be assessed for predetermined winning symbol combinations, or performed simply to obtain the final arrangement, which is then assessed for predetermined winning symbol combinations. Similarly, the re-arrangement of symbols can be first performed for each of the orbits and then performed for the sectors. Given the original game outcome as provided above, a sector-first sort followed by an orbit sort would result in the following symbol arrangement outcome:

| | Sector 1 | Sector 2 | Sector 3 | Sector 4 | Sector 5 | Sector 6 | Sector 7 | Sector 8 |
|---|---|---|---|---|---|---|---|---|
| Orbit 1 | A | B | B | C | C | C | D | E |
| Orbit 2 | B | B | C | D | D | E | E | H |
| Orbit 3 | B | C | C | D | E | F | F | H |
| Orbit 4 | B | C | C | D | E | H | H | H |

It can be seen that this two-step re-arrangement or sorting of symbols provides a significant re-generation of the symbol array and provides the potential for different predetermined winning symbol combinations. New symbol combinations significantly different than those in the sector sort and orbit sort can be seen in this example. The symbol arrangement outcome for the orbit-first sort followed by the sector sort is shown, below:

| | Sector 1 | Sector 2 | Sector 3 | Sector 4 | Sector 5 | Sector 6 | Sector 7 | Sector 8 |
|---|---|---|---|---|---|---|---|---|
| Orbit 1 | A | B | B | B | C | C | D | E |
| Orbit 2 | B | B | C | C | C | D | D | E |
| Orbit 3 | B | C | D | E | E | E | F | H |
| Orbit 4 | C | C | D | F | H | H | H | H |

As with the above two-step sorting, this two-step re-arrangement of symbols similarly provides a significant re-generation of the symbol array leading to the potential for different predetermined winning symbol combinations. It should be readily apparent to those skilled in the art that this feature can be similarly implemented within the spiral matrix.

It has been disclosed that both the orbital matrix and spiral matrix can be differently designed. A 4 by 8 orbital matrix (four orbits, eight sectors) has been the embodiment most discussed for the orbital matrix and the 5 fully looped, nine sector embodiment most discussed for the spiral matrix. But the gaming system can embody any layout subject to the limitations previously discussed. Mathematics and game programming can be developed to comport with any number of sectors, orbits, sector payline and orbital paylines and, similarly, any number of spiral loops, sectors, sector paylines, and spiral paylines. Each different layout provides a slightly different experience for the player. A 3 orbit by 3 sector orbital matrix game will provide a somewhat different experience than a 3 orbit by 8 sector game which will feel different than an 8 orbit by 3 sector game which will feel different than a 4 orbit by 12 sector game. The first being most simplistic but readily apparent in result; the next being a more orbit-focused game having eight positions along each orbit and the higher potential for wins and larger wins but just three positions along each sector; the next being sector focused having eight positions along each sector but just three along each orbit; with the last providing much excitement and opportunity along each orbit by providing 12 positions and an even greater chance for more and larger wins.

In an embodiment of a gaming system, a selection is provided that allows the player to select from a variety of different configurations. The orbital matrices may be pre-set such that, for instance, any of the four just described could be selected. In another embodiment, the player can select from nearly any number of sectors and any number of orbits within a minimum and maximum number of each to form a variety of different configurations. The game math would adjust, accordingly, upon selection in accordance with the gaming software depending on the selections to accommodate the configuration. The gaming system will then display the display the configuration and properly operate the game.

Figure 8:
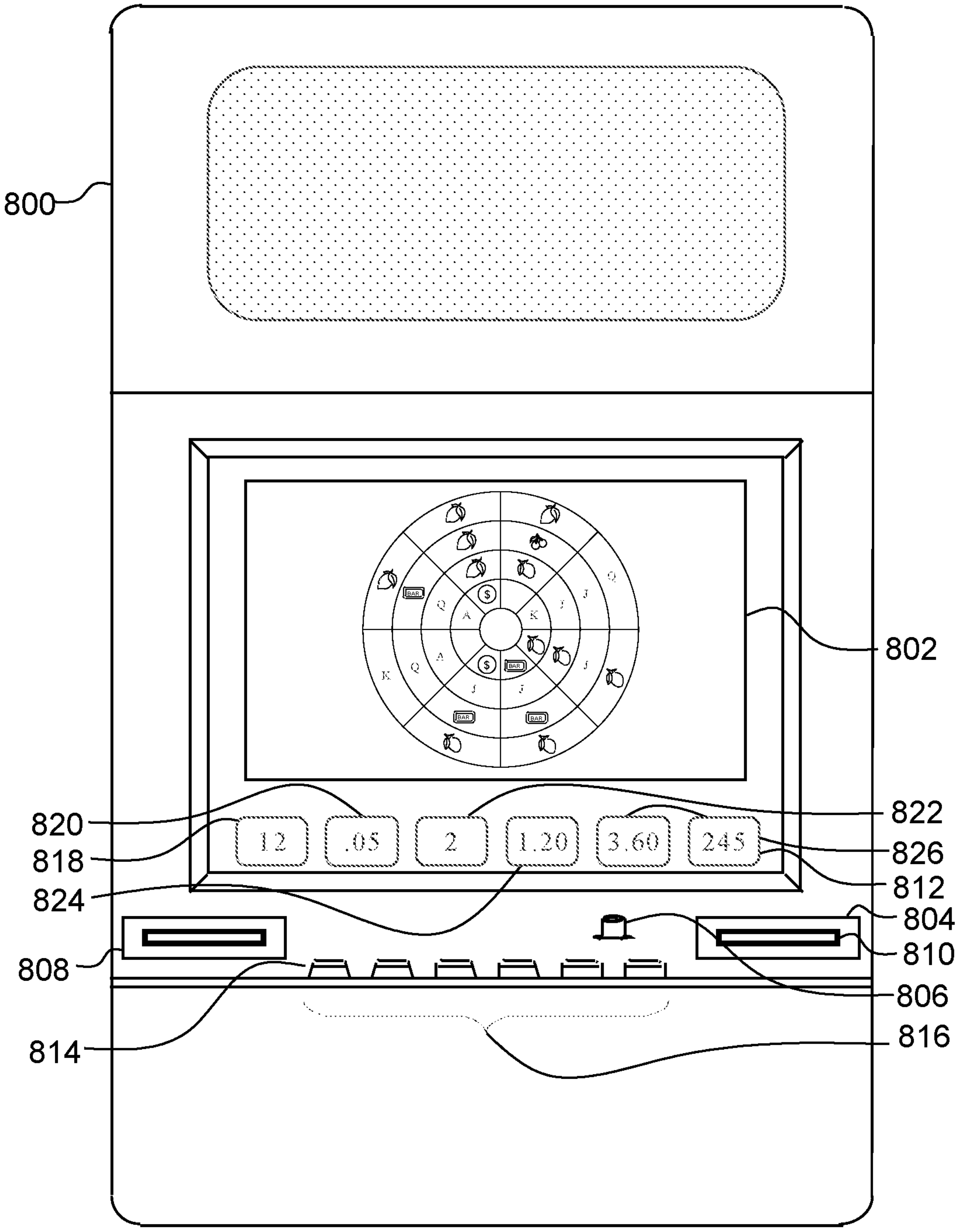
FIG. 8 shows an electronic gaming machine and its typically associated peripheral devices.
Figure 9:
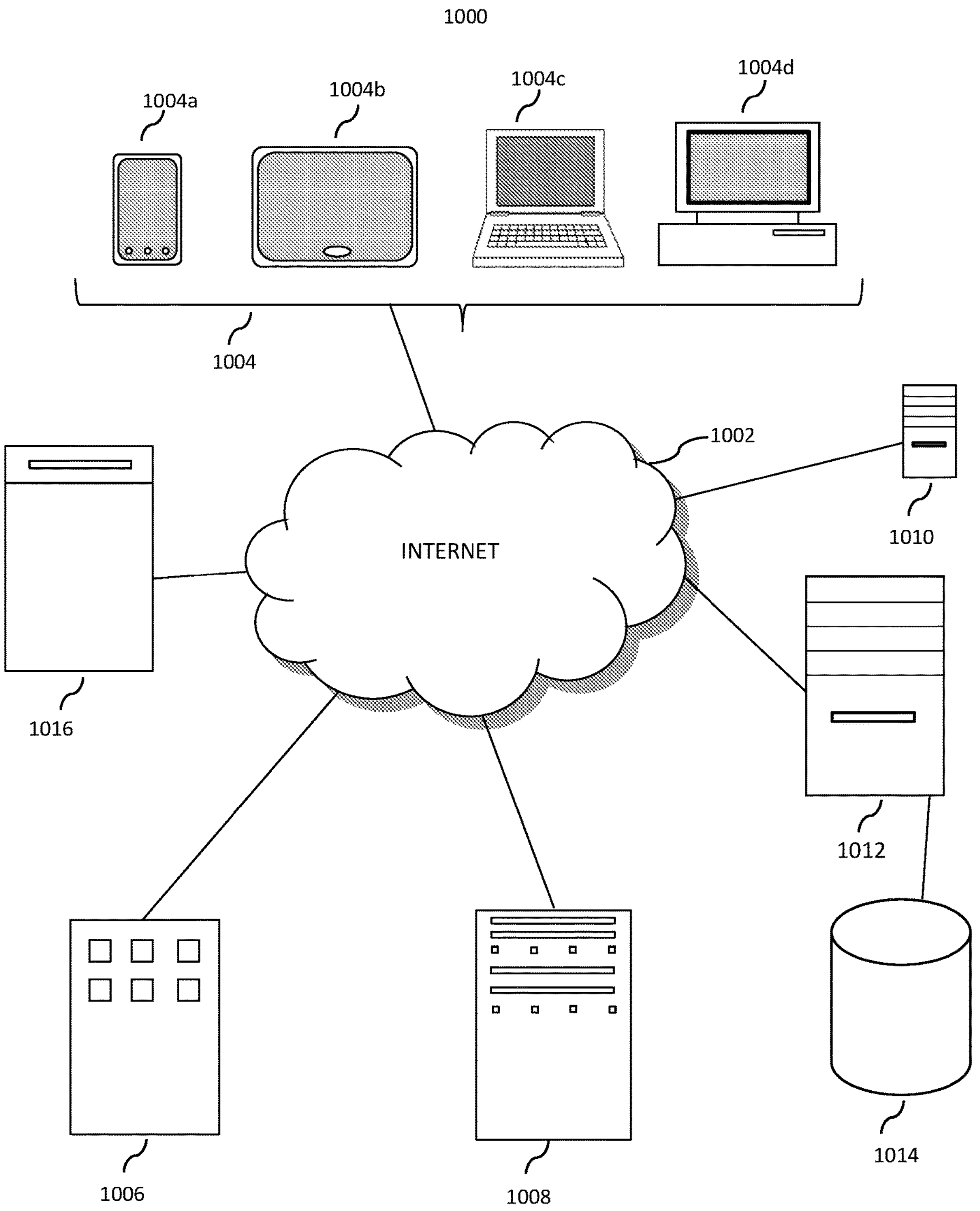
FIG. 9 displays a schematic of a basic gaming system in an online server-based game delivery system.

The invention can be configured for use in a variety of gaming system configurations. A representation of a gaming system in which the features and functions of the invention can be used is shown in FIG. 8. It is an exemplative electronic gaming machine 800 also referred to as an EGM.

Electronic gaming machine 800 possess at least one processor configured to operate with at least one memory device. Memory includes both volatile such as random access memory (RAM) and nonvolatile memory such as read only memory (ROM), which can be of various forms such as an erasable programmable ROM or EPROMs, flash memory, optical discs, magnetic hard drives, and other forms of memory known in the industry. There are a variety of input devices and output devices. Most of the input devices are associated with the making of a wager and for controlling the flow of funds or credit to and from the gaming device. Such input components include, but are not limited to, bill validator 804, coin acceptor 806, card acceptor 808, and ticket acceptor/dispenser 810. These components are all well known in the gaming arts.

Bill validator 804 accepts the insertion of paper currency in the form of bills, identifies the amount of each bill inserted and, depending on the denomination assigned by electronic gaming machine 800, which can be pre-established and invariable or selectable from a number of different designations, a number of credits are calculated and displayed on credit meter 812. Some slot machines are developed to allow for only one established denomination. Therefore, there is no variation in denomination and the number of credits that will be established for the inserted currency amount will be calculated based on such set denomination. For example, if a particular slot machine is designed to allow for wagers of only twenty-five cents ($0.25) or in increments of that denomination, if a ten dollar bill is inserted into bill validator 804, the gaming device programming will calculate 40 credits and display said amount on the credit meter 812 or add 40 credits to the amount already displayed. However, modern slot machines allow for selection of the denomination. The programming of electronic gaming machine 800 and bill validator 804 allows the player to select the denomination from a number of different denominations and the credit amount is calculated based on the denomination selected and the amount of the bill or bills that were inserted into bill validator 804. For example, if the denomination selected is five cents ($0.05) and a ten dollar bill is inserted into bill validator 804, the applicable programming will calculate 200 credits and display said amount on credit meter 812 or add 2000 credits to the amount already displayed. If an amount is already displayed, it will be displayed based on the selected denomination. Thus, if there were 15 credits displayed on the credit display 812 when the selected denomination was twenty-five cents, upon a change of selection to a denomination of five cents, credit meter 812 will be updated to reflect a new amount of 75 credits. The value remains the same; only the credit total changes based on the selected denomination.

Coin acceptor 806 is another form of input device. Coin acceptor 806 is generally a throwback to older slot machines that accepted only coins and no paper currency. However, they remain on some slot machines.

Card acceptor 808 exists as an input device to read credit cards and debit cards used for transferring credit or funds. Such peripheral devices exist in electronic communication with financial establishments external to the licensed gaming establishment in which electronic gaming machine 800 resides. This is necessary for enabling electronic funds transfer or ETF between gaming machine 800 and such financial establishment.

Internal systems also exist for transferring value. Cashless ticket systems are widely used in today's licensed gaming establishments. Electronic gaming machine 800 includes a ticket acceptor/dispenser 801, which may have the dual function of operating with bill validator 804. The cashless ticket system works through ticket coding. Each ticket represents a specific value and is encoded with a unique bar code or other form of unique identification (e.g., a QR code) that represents that value and the ticket's association with the cashless ticket system. The system securely stores the value of each ticket printed by a ticket printer (not shown) and is distributed through ticket acceptor/dispenser 810. A player inserts either paper currency or ticket into bill validator 804 or ticket acceptor/dispenser 810. Upon conclusion of play, a ticket is printed and distributed back to the player through ticket acceptor/dispenser 810 with a new value represented by a unique code printed thereon. The ticket can then be brought to a different slot machine or gaming device that also has a ticket acceptor/dispenser 810 and that is in communication with the cashless ticket system. The unique code of the ticket is read as a function of ticket acceptor/dispenser 810. The code is then matched to an entry securely stored in a database of the system's memory which is linked in the entry to the associated value. The value is read and transmitted to electronic gaming machine 800 where its value is displayed as available credit in credit meter 812. The process may repeat multiple times by pressing cash out button 814 in button panel 816 and having the ticket acceptor/dispenser 810 dispense a new ticket with new value (depending on the results of play and subject to at least some remaining value) and inserting the new ticket into a different machine also having a ticket acceptor/dispenser 810 that is in communication with the cashless ticket system. To redeem the ticket for currency a player may visit a kiosk stationed within the licensed gaming establishment that possesses the ability to read the ticket, find its value within the cashless system's database, and dispense currency in the form of bill and coin in said amount. The ticket value associated therewith is rendered null and thus provided no value. Alternatively, human attendants of the gaming establishment having ticket verification devices can read the ticket for the patron and physically distribute the amount of value represented by that ticket. The ticket is then similarly rendered null.

There are additional inputs associated with making a wager. These pertain more closely to the actual wager being made. One such input can be the selection of paylines. Another input can be selection of the denomination to be wagered (discussed above). Yet another can be the number of credits to be wagered per payline. All of these selections can be made using an assigned button of button panel 26. Game system coding assigns each button a specific type of input and uses such input, accordingly, to process functions of the system.

In the preferred embodiment of the present invention, there is no payline selection. All sector paylines and all orbital paylines, or spiral payline, as the case may be, are active for each game played. However, in other embodiments where line selection is available, in simplest example, if one payline is selected and one credit is wagered per payline, and the denomination of $0.05 is selected, the total wager will be $0.05 (i.e., 1 payline×1 credit per payline×$0.05 denomination). Only outcomes along the one selected payline will yield potential results. Outcomes along any other paylines will be given no effect and no value even if the symbol combination displayed would otherwise have been a winning outcome. A more involved wager might be, for example, a selection of 16 paylines and three credits wagered per payline. If the denomination selected is $0.05, the total wager will be $2.40 (i.e., 16 paylines×3 credits per payline×$0.05 denomination) but just $0.15 per payline (i.e., 1 payline×3 credits per payline×$0.05). If the game includes only 16 possible paylines, all paylines will be active and thus consequential. However, if additional paylines could have been selected, the outcomes coinciding with those additional paylines would be null regardless of whether or not the symbol combination would have otherwise been a predetermined winning symbol combination. An assigned button in button panel 816 can be assigned for use to select the number of paylines, the denomination and the credits to be wagered per payline. The number of paylines selected are displayed in the payline window 818. The denomination selected is displayed in denomination window 820. The credits per payline are displayed in window 822. And the total wager is displayed in wager window 824. Another window 826 displays the win, if any, per play of the game.

Another means for inputting the selection of denomination, number of paylines and the number of credits per payline, or for other required inputs such as volume control or input related to game play activities, is a capacitive surface interface (not shown) associated with video display screen 802. The capacitive surface interface receives input through player touch of video display screen 802 which then localizes the change in capacitance, maps the location, and processes a given input based on the defined location. For instance, a plus and minus sign can be displayed alongside credit per payline window 822. As the plus sign is touched, the credit number will increase and the updated number of credits will be displayed.

In the preferred embodiment of the invention, there is no selection of paylines. All paylines are made active. Only denomination and credit per payline are available for controlling the wager per payline and total wager. The button panel, which can also be developed on electronic gaming machine 800 as a touch screen, is programmable thus enabling the selectable inputs to forego the addition of a payline selection button. However, in embodiments that enable payline selection, button panel 816 can be programmed for such. Additionally, given the potential for variance in outcome potential between sector paylines and orbital paylines in the orbital matrix, and sector paylines and spiral paylines in the spiral matrix, a gaming system can be designed that distinguishes between each such selection of one or the other, depending on the outcome potential, will require a greater wager.

In the preferred embodiment, the number of lines is shown as 12 in the window 820 corresponding with the four orbital paylines and the eight sector paylines of the present game configuration. The denomination is shown in window 820 as five cents. The number or credits per payline is two making each bet per payline 2×0.05 or 0.10 cents. The total wager for the 12 paylines is displayed in window 824 as $1.20. A return or win on the play of the game is displayed in window 826 as $3.60 due to the randomly selected symbols matching some of the predetermined winning symbol combinations. A paytable (not shown) is generally displayed or available for display to show all of the predetermined winning symbol combinations and the return that can be achieved upon their outcome. The remaining number of credits, which is determined based on the denomination selected and displayed in window 820 is 245 indicating a value of 0.05×225=$12.25.

As gaming system 800 is a computing device, in addition to the specialized components, devices and software modules associated with such, it includes basic features of a computer. Internally, the EGM includes at least one processor for processing computer software instructions stored in least one memory device. Such memory devices may include read only memory (ROM) and for storing random access memory (RAM), magnetic disc, flash memory optical memory or the like. Memory for the EGM is generally stored internally with the EGM cabinet but can also be stored locally in a server and delivered to the EGM on call or hosted at a non-resident location or in the cloud.

The processor receives input for initiating the play of the game and then processes game code stored in memory to operate the dynamics of game play, including the random number generator module. Graphic output is sent to the video display screen 802 and sound output to speakers. In the event of a winning outcome resulting in a return to the player, the processor executes instructions to distribute credits to the credit meter based on the currently selected denomination. Alternatively, upon the win or in the event the player cashes out, the return to the player is provided directly in the form of coins through a coin disbursement mechanism (not shown). For gaming machines having cashless ticketing the player may elect to cash out at any time. When they do the player receives a value-bearing ticket as discussed above, which can be redeemed for cash or used for further play at another gaming device. Card acceptors are another means, as discussed above, for delivering funds through electronic funds transfer to the gaming machine. Open standard application protocol interfaces (APIs) developed for use in the industry are generally used for communicating information between certain of the input devices, output devices, the gaming machine 800, and the accounting and monitoring system of the gaming system.

When the invention is configured for use with a server-based game delivery system, personal computers and mobile computer devices provide the necessary inputs and the video display screen. FIG. 10 provides a general depiction of a server-based game delivery system 1000. All devices are in communication through Internet 1002. Gaming operations are streamed to and displayed on client device 1004, which can include a smart phone 1004*a*, computer tablet device 1004*b*, a laptop computer 1004*c*, or through personal computer 1004*d*.

The input devices of a personal computer 1004*d* and the other devices 1004*a*, 1004*b* and 1004*c*, are well known prior art. They include a mouse, keyboard, and keypad, but can also include a capacitive surface interface or touchscreen similar to that used with video display screen 802 of gaming machine 800, among other items known in computing art. The client devices 1004 include a video display screen, at least one processor for computing electronic operations, and memory. All modules of server-based game delivery system 1000 access and conduct communications through Internet 1002. The basic modules of online gaming system 1000 include, in addition to client devices 1004, and the infrastructure that is the Internet 1002, are a financial provider 1006, online game operator 1008, player account management system (PAM) 1010, and remote game server (RGS) 1012. The system may also include an aggregation platform 116 that receives games from multiple RGS providers and delivers the games to the online game operator 1008. To initiate game play, a player securely logs on to the website of licensed online game operator 1008 from within the territory in which online game operator 1008 is licensed. Geographic compliance software enables online game operator 1008 to verify the location of the player. The player selects a game from a library of games 1114 available for play. The games are delivered to online game operator 1008 through remote gaming server 1012 or an aggregation platform to which one or more remote gaming server providers are linked. Player account management system 1010 manages all financial transactions within the server-based game delivery system. Funds are thus drawn as either credit or debit from financial provider 1006 and securely transferred to and made available in the player's account held within PAM 1010 for wagering. In a manner similar to that of electronic gaming machine 800, the player uses the inputs of the client device 1004 to select paylines, wager per payline and denomination, among other things. Game operations are activated and securely conducted between remote game server 1012, player account management 1010, online game operator 1008 and client device 1004 to play the game, obtain an outcome and manage the funds associated with the wager. Online game operator 1008 receives games from one or more remote game servers. This all conducted through remote operations and under a secure server environment as dictated and regulated by applicable gaming authorities.

It is also possible to practice the present invention through a server-based game delivery system in social casino gaming. Social casino gaming, a form of gaming provided online using the Internet, allows for wagering, but only through the use of virtual currency. Virtual currency may then be wagered in lieu of genuine currency, credit or other form of legal tender. Virtual currency is created only for, and is used only with social gaming and, more particularly, within the specific social gaming site(s) that accept virtual currency of the type created. The virtual currency has no other tradable or redeemable value. It provides for the play of games or to purchase virtual indicia within the social gaming site to enhance or enable the play of the game; as opposed to genuine currency that is generally available to purchase goods and services of any kind throughout the world. For a game of chance within a social casino gaming site, the virtual currency can be used in a manner similar to genuine currency such that a player can make a wager on the game in consideration for a chance to receive a winning outcome. A winning outcome may provide additional virtual currency but it is only useable within the social gaming site. Virtual currency is acquired in such a way but can also be purchased or received as part of a promotion, contest or as a gift. The present invention provides for both the wagering of virtual currency within a social gaming environment and real money wagering within legal gambling jurisdictions, including both land-based and online jurisdictions, and can be practiced in both environments. The social casino game provider generally displays a number of games available for the player to play. The player selects one of the games. The graphical and video representation of the game is streamed through the Internet or wide area network to the player's personal computer or mobile device. An amount of virtual currency held in a player's account is credited to the video game for play.

A It should be understood that the foregoing relates primarily to preferred embodiments of the invention but is not limited to such, and that modifications and variations may be made without departing from the spirit and scope of the invention as set forth in the following claims.

What is claimed is:

1. A gaming system used by a player for the operation of electronic game play comprising:

at least one input device;

at least one memory storage location for storing instructions associated with a game;

at least one processor;

at least one display device, wherein upon input associated with a wager made by the player through the at least one input device, the instructions are executed by the at least one processor to display on the display device:

(a) a plurality of concentric circles;

(b) a plurality of radial lines orthogonally intersecting each of said concentric circles to form a plurality of positions bounded by two of said plurality of concentric circles that are adjacently positioned and two of said plurality of radial lines that are adjacently positioned; and (c) a plurality of symbols randomly selected from a set of symbols for display within said plurality of positions with each of said plurality of positions containing one of said plurality of symbols; wherein:

(i) a plurality of sector paylines are established along each of a subset of positions from the plurality of positions that are bounded by two adjacent radial lines from the plurality of radial lines;

(ii) a plurality of orbital paylines are established along each of a subset of positions from the plurality of positions that are bounded by two adjacent concentric circles from said plurality of concentric circles; and (iii) the processor reads the symbols on each of the plurality of sector paylines sequentially along the sector payline to establish a plurality of sector symbol combinations and on each of the plurality of orbital paylines sequentially along the orbital payline to establish a plurality of orbital symbol combinations and provides the player a return on the wager for each of the sector symbol combinations and each of the orbital symbol combinations that contain a combination of symbols matching at least one predetermined combination of symbols.

2. The gaming system of claim 1, wherein each of said plurality of sector paylines is contained within a sector and each of said plurality of orbital paylines is contained within an orbit and the at least one input device provides the player the ability to select the number sectors and the number of orbits to be displayed on the display device.

3. The gaming system of claim 2, wherein the at least one input device provides the player the ability to select from a plurality of combinations of set numbers of sectors and orbits the combination of the number of sectors and orbits to be displayed on the display device.

4. The gaming system of claim 1, wherein the processor reads the sector symbol combinations on a selected number of sector paylines and the orbital symbol combinations on a selected number of orbital paylines selected that can be less than the total number of sector paylines and less than the total number of orbital paylines.

5. The gaming system of claim 1, wherein the concentric circles are displayed as different shapes, such shapes comprising regular polygons and ellipses.

6. The gaming system of claim 1, wherein said randomly selected symbols are displayed along the radial lines and the along the concentric circles and the sector paylines and the orbital paylines coincide with said radial lines and said concentric circles to generate an additional orbital payline.

7. The gaming system of claim 1, wherein one of the symbols within the combination of symbols that match a predetermined combination of symbols must be displayed in a designated position to achieve a return on the wager.

8. The gaming system of claim 1, further comprising:

removing the combination of symbols matching the one or more predetermined winning symbol combinations;

filling the positions of the combination of symbols that were removed with randomly selected symbols from the set of symbols, wherein:

the processor reads the symbols on each of the plurality of sector paylines sequentially along the sector payline to establish a plurality of sector symbol combinations and on each of the plurality of orbital paylines sequentially along the orbital payline to establish a plurality of orbital symbol combinations and provides the player a return on the wager for each of the sector symbol combinations and each of the orbital symbol combinations that contain a combination of symbols matching at least one predetermined combination of symbols.

9. A method of operating a gaming system to play a game, said method comprising:

(a) activating a processor through an input including a wager using at least one input means to read and execute a plurality of instructions to play a game, said instructions causing said gaming system to:

(i) display a plurality of randomly selected symbols from a symbol set in a plurality of positions formed by a plurality of concentric circles intersecting with a plurality of radial lines with each of said plurality of selected symbols displayed in each of said plurality of positions;

(ii) for each of the positions that lie at the same angular location of the concentric circles, read the symbols from either of the positions that has only one adjacent position to the other position that has only one adjacent position in a sequential manner that reads in order the next adjacent position not previously read to determine a combination of symbols;

(iii) for each of the positions existing between two adjacent concentric circles of the plurality of concentric circles, read the symbols in a sequential manner from a first position to the next adjacent position not previously read until all positions are read to determine a combination of symbols with said combination of symbols having no starting position and have no terminating position;

(iv) compare each of the combination of symbols to a table of predetermined symbol combinations to determine if within said combination of symbols there is contained a pattern of symbols that match any of a plurality of predetermined symbol combinations;

(v) providing an award for each of said combination of symbols that contain a pattern of symbols that match any of the predetermined symbol combinations in accordance with the amount of the wager and the award indicated by the table.

10. The method of claim 9, wherein the positions between each of two adjacent concentric circles form an orbit, the positions between each of two adjacent radial lines form a sector and selecting through the at least one input means the number of sectors and the number orbits to be displayed.

11. The method of claim 9, wherein the positions between each of two adjacent concentric circles form an orbit, the positions between each of two adjacent radial lines form a sector and selecting through the at least one input means a combination of said sectors and said orbits from a plurality of combinations of said sectors and said orbits.

12. The method of claim 9, wherein less than all of the series of symbols that are provided an award when a combination of read symbols matches a predetermined symbol combination are provided an award, even if a combination of read symbols matches a predetermined symbol combination in one of said series of symbols not provided an award.

13. The method of claim 9, wherein the concentric circles are displayed as different shapes, such shapes comprising regular polygons, ellipses and a spiral.

14. The method of claim 9, wherein the operation of the gaming system is conducted through a networked system including the Internet.

15. The method of claim 9, wherein the combination of symbols between said two adjacent concentric circles from said plurality of concentric circles includes a starting position and a terminating position so that the pattern of symbols may not include both the starting position and the terminating position unless all positions of combination of symbols are included in the pattern of symbols.

16. A gaming system used by a player for the operation of electronic game play comprising:

at least one input device;

at least one memory storage location for storing instructions associated with a game;

at least one processor;

at least one display device, wherein upon input associated with a wager made by the player through the at least one input device, the instructions are executed by the at least one processor to display on the display device:

(d) a spiral having a plurality of radially expanding, circular loops to form an arc length;

(e) a plurality of radial lines orthogonally intersecting each of said circular loops to form a plurality of positions bounded by two of said plurality of circular loops adjacently positioned and two of said plurality of radial lines adjacently positioned; and (f) a plurality of symbols randomly selected from a set of symbols for display within said plurality of positions with each of said plurality of positions containing one of said plurality of symbols; wherein:

(iv) a plurality of sector paylines are established along a subset of positions from the plurality of positions that are bounded by two adjacent radial lines from the plurality of radial lines;

(v) a payline is established along positions of the plurality of positions of the arc length of the spiral to establish a spiral payline; and (vi) the processor reads the symbols on each of the plurality of sector paylines sequentially along the sector payline to establish a plurality of sector symbol combinations and sequentially along the spiral payline to establish a spiral symbol combination and provides the player a return on the wager for each of the sector symbol combinations along each of the plurality of sector paylines and for the spiral symbol combination along the spiral payline that contain a pattern of symbols that match at least one predetermined combination of symbols.

17. The gaming system of claim 16, wherein the at least one input device provides the player the ability to select from a plurality of arc lengths, the arc length of said spiral to be displayed on the display.

18. The gaming system of claim 16, wherein said randomly selected symbols are displayed along the radial lines and the along the circular loops of the spiral and the sector paylines and spiral payline coincide with said radial lines and said spiral generating additional symbols along the sector paylines and additional symbols along the spiral payline.

19. The gaming system of claim 16, wherein the spiral payline is segmented into a plurality of semi-spiral paylines and the processor reads the combination of symbols along each of said semi-spiral paylines to determine a combination of symbols having no starting position and having no terminating position and provide the player a return of the wager for each of the semi-spiral paylines that contain a combination of symbols matching the at least one predetermined combination of symbols.

* * * * *